US011034791B2

(12) United States Patent
Dai et al.

(10) Patent No.: US 11,034,791 B2
(45) Date of Patent: Jun. 15, 2021

(54) MECHANOPHORE-GRAFTED POLYMERS TO FORM STRESS-RESPONSIVE THERMOSET NETWORK

(71) Applicants: Lenore Dai, Phoenix, AZ (US); Aditi Chattopadhyay, Chandler, AZ (US); Elizabeth Nofen, Phoenix, AZ (US); Jin Zou, San Diego, CA (US); Bonsung Koo, Tempe, AZ (US)

(72) Inventors: Lenore Dai, Phoenix, AZ (US); Aditi Chattopadhyay, Chandler, AZ (US); Elizabeth Nofen, Phoenix, AZ (US); Jin Zou, San Diego, CA (US); Bonsung Koo, Tempe, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 0 days.

(21) Appl. No.: 16/349,221

(22) PCT Filed: Dec. 20, 2017

(86) PCT No.: PCT/US2017/067746
§ 371 (c)(1),
(2) Date: May 10, 2019

(87) PCT Pub. No.: WO2018/119157
PCT Pub. Date: Jun. 28, 2018

(65) Prior Publication Data
US 2020/0190250 A1   Jun. 18, 2020

Related U.S. Application Data

(60) Provisional application No. 62/436,950, filed on Dec. 20, 2016.

(51) Int. Cl.
| | | |
|---|---|---|
| *C08G 59/14* | (2006.01) | |
| *C08G 59/50* | (2006.01) | |
| *C08K 5/20* | (2006.01) | |
| *C08L 63/00* | (2006.01) | |
| *G01L 1/24* | (2006.01) | |

(52) U.S. Cl.
CPC ..... *C08G 59/1477* (2013.01); *C08G 59/5006* (2013.01); *C08K 5/20* (2013.01); *C08L 63/00* (2013.01); *G01L 1/241* (2013.01)

(58) Field of Classification Search
CPC .......... C08K 5/20; C08G 59/14; C08G 59/18; C08G 59/44; C08G 59/1438; C08G 59/1477; C08L 2666/36
See application file for complete search history.

(56) References Cited

U.S. PATENT DOCUMENTS

| | | |
|---|---|---|
| 2010/0206088 A1 | 8/2010 | Potisek et al. |
| 2013/0274412 A1 | 10/2013 | Hickenboth et al. |
| 2016/0009845 A1 | 1/2016 | Gordon et al. |
| 2016/0097641 A1 | 4/2016 | Dai et al. |
| 2016/0168314 A1* | 6/2016 | Wu .................. C08K 5/00 528/420 |
| 2016/0332121 A1 | 11/2016 | Datta et al. |

OTHER PUBLICATIONS

Ali et al., "Photoresponsive functionalized vinyl cinnamate polymers: synthesis and characterization", Polymer International, vol. 43, pp. 310-316, 1997.
Bai et al, "Synthesis of a diamine cross-linker containing Diels-Alder adducts to produce self-healing thermosetting epoxy polymer from a widely used epoxy monomer", Polymer Chemistry, vol. 4, pp. 724-730, 2013.
Beiermann et al., "Environmental effects on mechanochemical activation of spiropyran in linear PMMA", Journal of Materials Chemistry, vol. 21, pp. 8443-8447, 2011.
Bekyarova et al., "Multiscale carbon nanotube-carbon fiber reinforcement for advanced epoxy composites", Langmuir, vol. 23, pp. 3970-3974, 2007.
Beyer et al., "Mechanochemistry: The Mechanical Activation of Covalent Bonds", Chemical Reviews, vol. 105, No. 8, pp. 2921-2948, 2005.
Black et al. "Mechanochemically triggered bond formation in solid-state polymers", Journal of Materials Chemistry, vol. 21, pp. 8460-8465, 2011.
Black et al., "From molecular mechanochemistry to stress-responsive materials", Journal of Materials Chemistry, vol. 21, pp. 1655-1663, 2011.
Brantley et al., "Polymer mechanochemistry: the design and study of mechanophores", Polymer International, vol. 62, pp. 2-12, 2013.
Caruso et al., "Mechanically-induced chemical changes in polymeric materials", Chem. Review, vol. 109, pp. 5755-5798, 2009.
Celestine et al., "Fracture-induced activation in mechanophore-linked, rubber toughened PMMA", Polymer, vol. 55, pp. 4164-4171, 2014.
Cho et al, "A flourescent crack sensor based on cyclobutane-containing crosslinked polymers of tricinnamates", Sensors and Actuators, B, vol. 134, pp. 822-825, 2008.
Cho et al., "Photochemical crack healing in cinnamate-based polymers", Journal of Nanoscience and Nanotechnology, vol. 10, pp. 6872-6976, 2010.
Chung et al., "Crack Healing in Polymeric Materials via Photochemical [2+2] Cycloaddition", Chem. Mater., vol. 16, pp. 3982-3984, 2004.
Cintas et al., "Measure the force of sound", Mechanochemistry, vol. 4, pp. 77—2012.

(Continued)

Primary Examiner — Ana L. Woodward
(74) Attorney, Agent, or Firm — Michael Best & Friedrich LLP

(57) ABSTRACT

Compositions including a thermosetting polymer network and a mechanophore covalently bonded to the thermosetting polymer network are provided. Substrates including the compositions are provided. In addition, methods of making the compositions and methods of monitoring stress on a substrate comprising the compositions are provided.

11 Claims, 18 Drawing Sheets

(56) References Cited

OTHER PUBLICATIONS

Davis et al., "Force-induced activation of covalent bonds in mechanoresponsive polymeric materials", Nature, vol. 459, pp. 68-72, 2009.
Evtushenko et al., "Determination of Epoxide and Hydroxyl Groups in Epoxide Resins by IR Spectrometry", Journal of Analytical Chemistry, vol. 58, No. 4, pp. 347-350, 2003.
Gillham, "The TBA Torsion Pendulum: a Technique for Characterizing the Cure and Properties of Thermosetting Systems", Polymer International, vol. 44, pp. 262-276, 1997.
Girard-Reydet et al., "Polyetherimide-Modified Epoxy Networks: Influence of Cure Conditions on Morphology and Mechanical Properties", Journal of Applied Polymer Science, vol. 65, pp. 2433-2445, 1997.
Gonjy et al., "Surface modified multi-walled carbon nanotubes in CNT/epoxy-composites", Chemical Physics Letters, vol. 370, pp. 820-824, 2003.
Gossweiler et al., "Mechanochemical activation of covalent bonds in polymers with full and repeatable macroscopic shape recovery", ACS Macro Letters, vol. 3, pp. 216-219, 2014.
Gostl et al., "π-extended anthracenes as sensitive probes for mechanical stress", Chemical Science, vol. 7, pp. 370-375, 2016.
Grdadolnik, "ATR-FTIR spectroscopy: its advantages and limitations", Acta Chim. Slov., vol. 49, pp. 631-642, 2002.
Gunckel et al., "Early damage detection of epoxy via poly(vinyl cinnamate) mechanophore using Fourier transform infrared spectroscopy" Materials Research Express vol. 4, pp. 075014, 2017.
Henbest et al., "Detection of the Epoxide Group by Infrared Spectroscopy", Chemical Society, pp. 1459-1462, 1957.
Hickenboth et al., "Biasing Reaction Pathways with Mechanical Force", Nature, vol. 446, pp. 423-427, 2007.
Ikawa et al., "Flourescence from Poly (N-vinylcarbazole) in Uniaxially Stretched Polymer Films", Journal of Applied Polymer Science, vol. 66, pp. 1569-1573, 1997.
International Search Report and Written Opinion for Application No. PCT/US2017/067746 dated Apr. 16, 2018 (11 pages).
James et al., "Mechanonchemistry: opportunities for new and cleaner synthesis", Chem. Soc. Rev., vol. 41, pp. 413-447, 2012.
Jensen et al., "Adhesive Properties of Cured Phenylethynyl-Terminated Imide Oligomers", J. Adhesion, vol. 54, pp. 57-66, 1995.
Jiang et al., "Mechanoresponsive PS-PnBA-PS triblock copolymers via covalently embedding mechanophore", ACS Macro Letters, vol. 2, pp. 705-709, 2013.
Johns et al., "Photo Retro-Diels-Alder Reactions", Journal of Physical Chemistry A, vol. 115, pp. 8093-8099, 2011.
Kaupp, "Mechanochemistry: the varied applications of mechanical bond-breaking", CrystEngComm, vol. 11, pp. 38-403, 2009.
Kazarin et al., "ATR-FTIR spectroscopic imaging: recent advances and applications to biological systems", Analyst, vol. 138, pp. 1940-1951, 2013.
Kingsbury et al., "Shear activation of mechanophore-crosslinked polymers", Journal of Materials Chemistry, vol. 21, pp. 8381-8388, 2011.
Koo et al. "Molecular dynamics study for experimental design guideline of dimeric anthracene-based mechanophore in the thermoset polymer matrix", Proceedings of the American Society for Composites—31st Technical Conference, DEStech Publications Inc, 2016.
Koo et al., "Atomistic modeling framework for a cyclobutane-based mechanophore-embedded nanocomposite for damage precursor detection", Computational Materials Science,vol. 120, pp. 135-141, 2016.
Koo et al., "Multiscale Modeling and Characterization of Stress-sensitive Mechanophore-embedded Nanocomposites", Structural Health Monitoring 2015: System Reliability for Verification and Implementation, pp. 2227-2234, 2015.
Kryger et al., "Structure-Mechanochemical Activity Relationships for Cyclobutane Machanophores", J. Am. Chem. Soc., vol. 133, pp. 18992-18998, 2011.
Kryger, "Masked Cyanoacrylates Unveiled by Mechanical Force", Journal Am. Chem. Soc., vol. 132, pp. 4558-4559, 2010.
Kulkarni et al., "Ballistic helmets—Their design, materials, and performance against traumatic brain injury", Composite Structures, vol. 101, pp. 313-331, 2013.
Larsen et al., "'Flex-activated' mechanophores: using polymer mechanochemistry to direct bond bending activation", Journal of the American Chemical Society, vol. 135, pp. 8189-8192, 2013.
Li et al., "Polymer Mechanochemistry: From Destructive to Productive", Accounts of Chemical Research, vol. 48, pp. 2181-2190, 2015.
Li, et al. "Effect of Polymer Grafting Density on Mechanophore Activation at Heterointerfaces" ACS Macro Letters, vol. 5, No. 7, pp. 819-822, 2016.
Liu et al., "Crosslinked Epoxy Materials Exhibiting Thermal Remendability and Removability from Multifunctional Maleimide and Furan Compounds", Journal of Polymer Science, vol. 44, pp. 905-913, 2006.
Liu et al., "Using high-temperature mechanochemistry treatment to modify iron oxide and improve the corrosion performance of epoxy coating—I. High temperature ball mililng treatment", Corrosion Science, vol. 90, pp. 451-462, 2015.
Montazeri et al., "Mechanical properties of multi-walled carbon nanotube/ epoxy composites", Materials and Design, vol. 31, pp. 4202-4208, 2010.
Nakamura et al., "Photodimerization of cinnamic acids controlled by molecular assemblies of surfactant amine N-oxides", Journal of Chemical Society Perkin Trans., vol. 2, pp. 2751-2755, 1997.
Nielsen, "Crosslinking-effect on Physical Properties of Polymers", Journal of Macromolecular Science , Review Macromol. Chem., C3, 69-103, 1969.
Nofen et al., "Dimeric anthracene-based mechanophore particles for damage precursor detection in reinforced epoxy matrix composites", Materials Research Express, vol. 3, 035701, 2016.
Nofen et al., "Stress-sensing thermoset polymer network via grafted cinnamoyl/cyclobutane mechanophore units in epoxy", Polymer Chemistry, vol. 7, pp. 7249-7259, 2016.
Nofen, "Stress Responsive Nano- and Microcomposites Featuring Mechanophore Units" Dissertation submission to Arizona State University, Aug. 2016, 273 pages.
Olmos et al., "A fluorescence method to estimate the distribution of stresses in polymer materials", Journal of Materials Processing Technology, vol. 143, pp. 495-500, 2003.
Oya et al., "Photoinduced mendable network polymer from poly(butylene adipate) end-functionalized with cinnamoyl groups", Polymer Journal, vol. 44, pp. 724-729, 2012.
Peterson, et al., "Room-Temperature Healing of a Thermosetting Polymer Network Using the Diels-Alder Reaction", ACS Applied Materials & Interfaces, vol. 2, No. 4, pp. 1141-1149, 2010.
Potisek et al., "Mechanophore-Linked Addition Polymers", Journal Am. Chem. Society, vol. 129, pp. 13808-13809, 2007.
Rafferty et al., "FT-IR imaging of patterned photocrosslinkable poly(vinyl cinnamate)", Applied Spectroscopy, vol. 56, pp. 1549-1551, 2002.
Rai et al., "Multiscale damage analysis of carbon nanotube nanocomposite using a continuum damage mechanics approach", Journal of Composite Materials, vol. 51, No. 6, pp. 847-858, 2016.
Roberts et al.,"Mechanochromic systems for the detection of stress, strain and deformation in polymeric materials", Journal of Materials Chemistry, vol. 21, pp. 8256-8268, 2011.
Rojac et al., "Using Infrared Spectroscopy to Identify New Amorphous Phases—A Case Study of Carbonato Complex Formed by Mechanochemical Processing" InTech, 2012, pp. 13-42, 2012.
Silberstein et al., "Modeling mechanophore activation within a crosslinked glassy matrix", Journal of Applied Physics, vol. 114, 023504, 2013.
Song et al., "Fluorescence sensing of microcracks based on cycloreversion of a dimeric anthracene moiety", Journal of Materials Chemistry, vol. 22, pp. 1380-1386, 2012.

(56) References Cited

OTHER PUBLICATIONS

Sottos, "Flex, release and repeat", Nature Chemistry, vol. 6, pp. 381-383, 2014.

Takagi, et al., "Organized Photodimerization of Unsaturated Carboxylates. Selectivity Control by Normal and Reversed Micelles", Journal Chemical Society Perkin Trans., vol. 2, pp. 1003-1009, 1994.

Tasdelen, "Diels-Alder 'click' reactions: recent applications in polymer and material science", Polymer Chemistry, vol. 2, pp. 2133-2145, 2011.

Vaidya et al., "Processing of fibre reinforced thermoplastic composites", International Material Review, vol. 53, No. 4, pp. 185-218, 2008.

Wang et al., "Inducing and quantifying forbidden reactivity with single molecule polymer mechanochemistry", Nature Chemistry, vol. 7, pp. 323-327, 2015.

Wang et al., "Mechanochemical strengthening of a multi-mechanophore benzocyclobutene polymer", ACS Macro Letters, vol. 4, pp. 834-837, 2015.

Wang et al., "The effects of CNT alignment on electrical conductivity and mechanical properties of SWNT/epoxy nanocomposites", Composites Science and Technology, vol. 68, pp. 1644-1648, 2008.

Yoshie et al, "A thermally-stable self mending polymer networked by Diels-Alder cycloaddition", Polymer, vol. 52, pp. 6074-6079, 2011.

Zako et al., "Intelligent Material Systems Using Epoxy Particles to Repair Microcracks and Delamination Damage in GFRP", Journal of Intelligent Material Systems and Structures, vol. 10, pp. 836-841, 1999.

Zhang, "Multiscale Modeling of Heterogeneous Material Systems", Arizona State University, PhD Thesis, 190 pages, 2014.

Zheng et al., "A novel approach to recycling of glass fibers from nonmetal materials of waste printed circuit boards", Journal of Hazardous Materials, vol. 170, pp. 978-982, 2009.

Zou et al. "Self Sensing of Matrix Damage using Mechanophore-based Smart Polymer in Fiber Reinforced Composites", Journal of Multifunctional Composites, vol. 2, No. 4, pp. 207-215, 2014.

Zou et al., "Early damage detection in epoxy matrix using cyclobutane-based polymers", Smart Materials and Structures, vol. 23, 095038, 2014.

Unpublished U.S. Appl. No. 16/390,969, filed Apr. 22, 2019.

Kim et al., "Mechanoactivation of Spiropyran Covalently Linked PMMA: Effect of Temperature, Strain Rate, and Deformation Mode," Macromolecules, vol. 48, pp. 1335-1342, 2015.

* cited by examiner

MECHANOPHORE-GRAFTED POLYMERS TO FORM STRESS-RESPONSIVE THERMOSET NETWORK

CROSS-REFERENCE TO RELATED APPLICATIONS

This application claims priority to U.S. Provisional Patent Application No. 62/436,950, filed Dec. 20, 2016, which is incorporated herein by reference in its entirety.

STATEMENT REGARDING FEDERALLY SPONSORED RESEARCH OR DEVELOPMENT

This invention was made with government support under W911NF-15-1-0072 awarded by the Army Research Office. The government has certain rights in the invention.

BACKGROUND OF THE INVENTION

The problem of catastrophic damage purveys in any material application, and minimizing its occurrence is key for general health and safety. Thus, novel damage detection schemes may be required that can sense precursors to damage. Mechanochemistry is an area of research that involves the use of mechanical force to induce a chemical change. Mechanophores are molecular units that utilize mechanochemistry to provide a measurable signal in response to an applied force, often in the form of a visible color change or fluorescent emission. Accordingly, the use of mechanophores as part of a material may be a useful strategy to sense damage to the material at an early time scale.

SUMMARY OF THE INVENTION

In one aspect, disclosed are compositions comprising a thermosetting polymer network, and a mechanophore covalently bonded to the thermosetting polymer network.

In another aspect, disclosed are substrates comprising a disclosed composition, wherein the composition optically changes upon application of a mechanical load to the substrate in excess of a predetermined level.

In another aspect, disclosed are methods of making a composition, the method comprising preparing a mixture comprising a thermosetting polymer network precursor, a mechanophore precursor, and a solvent; reacting the mixture to provide an intermediate composition; removing the solvent from the intermediate composition; and adding a polyfunctional hardener to the intermediate composition to provide a composition comprising a thermosetting polymer network and a mechanophore covalently bonded to the thermosetting polymer network.

In another aspect, disclosed are methods of monitoring stress on a substrate, the method comprising forming a substrate comprising a disclosed composition; using the substrate; measuring an optical property of the substrate; and comparing the measurement of the optical property of the substrate to a measurement of the optical property of the substrate prior to use, wherein comparing the measurement of the optical property is correlated to a stress applied to the substrate.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

FIG. 1A is an ATR-FTIR spectra for the reaction of cinnamamide (chemical structure inset left) with digycidylether of bisphenol F (DGEBF) over reaction time, middle inset—macroscopic image of the reaction solution over reaction time, right inset—ATR-FTIR spectra of the region between 3400 and 2900 $cm^{-1}$. FIG. 1B is an ATR-FTIR spectra for the reaction of dicinnamamide (chemical structure inset left) with DGEBF over reaction time, middle inset– macroscopic image of the reaction solution over reaction time, right inset—ATR-FTIR spectra of the region between 3400 and 2900 $cm^{-1}$.

FIG. 2A is ATR-FTIR spectra comparing cinnamamide (Cinn) (green) with di-cinnamamide (Di-Cinn) (orange). FIG. 2B is emission spectra of the neat epoxy (black), 10 wt % Cinn epoxy (red), 10 wt % Di-Cinn epoxy (blue) for an excitation wavelength of 350 nm. FIG. 2C is ATR-FTIR spectra comparing the neat epoxy (black), with the 10 wt % Cinn epoxy (red) and 10 wt % Di-Cinn epoxy (blue), with the inset image showing the neat epoxy, the 10 wt % Di-Cinn epoxy, and the 10 wt % Cinn epoxy samples (from left to right).

FIGS. 3A and 3B are DSC scans showing the glass transition for the FIG. 3A: neat epoxy (black) and the FIG. 3B: 10 wt % Cinn and Di-Cinn epoxy composites (red and blue, respectively), with the resulting glass transition temperature ($T_g$) values (as an average of 4 runs) inset on the top right of FIG. 3A. FIG. 3C is a set of SEM images showing the epoxy surfaces.

FIG. 4A is a plot of TGA curves showing the decomposition of neat epoxy (black), and the 10 wt % Cinn (red) and 10 wt % Di-Cinn (blue) epoxy composites, with the resulting major $T_d$ values (as an average of 4 runs) inset on the top right. FIG. 4B shows the respective DTG curves to determine the $T_d$ values.

FIG. 5B: 10 wt % Cinnamamide composite, and FIG. 5C: 10 wt % Di-Cinnamamide composite, respectively. The inset table of FIG. 5C shows the average $T_g$ and $\rho_{xl}$ of the samples determined from the DMA curves.

FIG. 7B: 10 wt % Di-Cinnamamide. Scale bars are 50 µm. The images were pseudo-colored green and the brightness and contrast were increased by 40% to enhance the visual analysis of the images.

FIG. 8A: Upper left inset shows the raw fluorescence intensity data for 2 batches of the 10 wt % Cinn epoxy composite, while the main image shows the overlay of the two curves by normalizing the intensity to the 0% strain value. FIG. 8B: Raw fluorescence intensity data for 2 batches of the 10 wt % Di-Cinn epoxy composite.

DETAILED DESCRIPTION

Figure 1A:
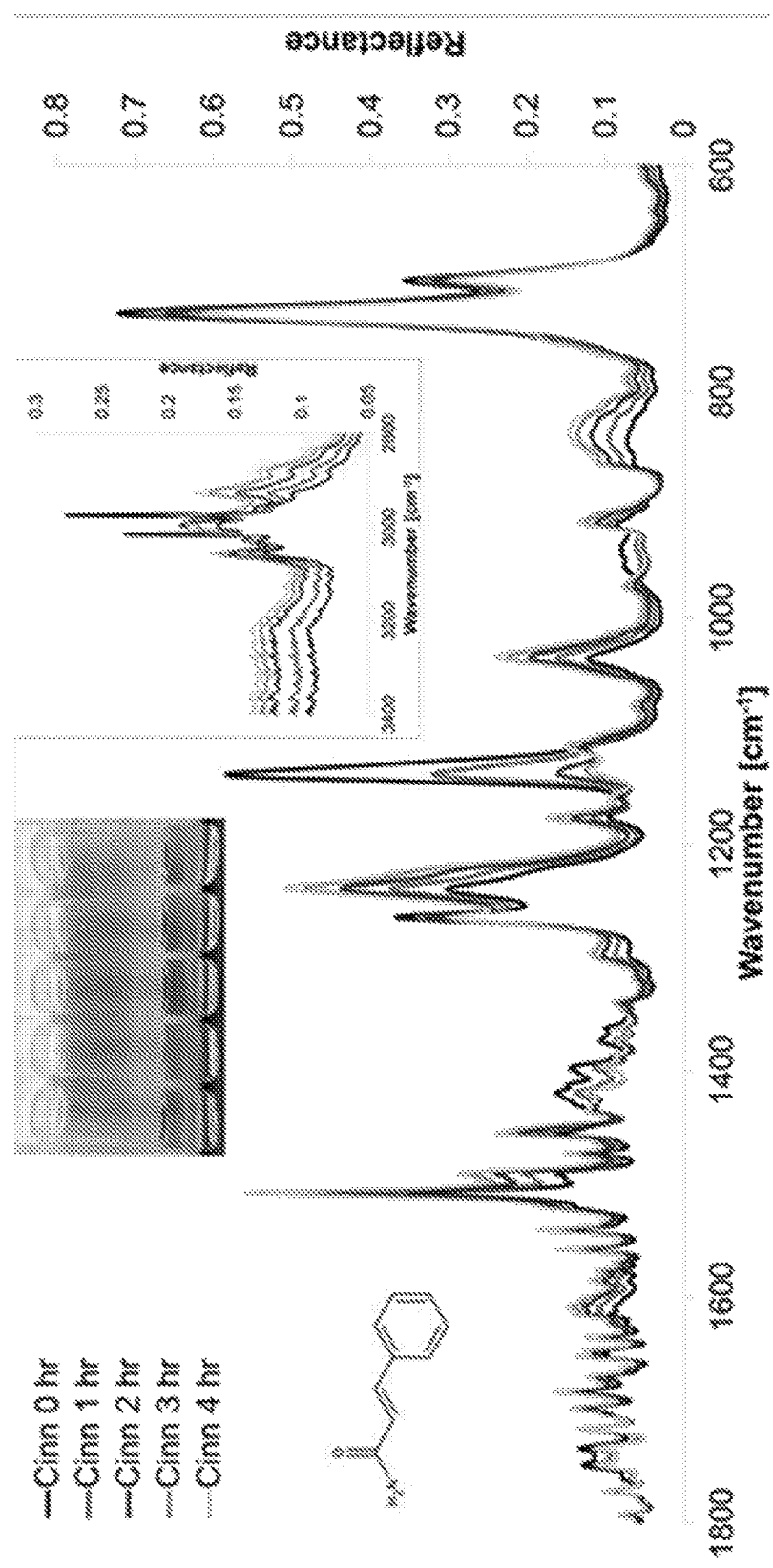
FIGS. 1A-B are attenuated total reflectance-Fourier transform infrared (ATR-FTIR) spectra for the reaction of exemplary compositions over time.

Composite materials pervade throughout man-made applications, combining multiple material properties and functionalities to fulfill a targeted need. The push for smaller, more robust, "smart" sensing devices has shifted some focus away from macroscale composites and towards micro- and nanocomposites, to exploit the unique mechanical, interfacial, thermal, and electrical properties that occur at the smaller length scales. Mechanochemistry encompasses the use of mechanical force to induce a chemical change, with specialized force-responsive molecular units, or mechanophores, being developed in recent years to probe the mechanical nature of chemical bonds and realize reaction pathways not possible via alternative means.

When mechanophores are simply used as stress-sensing additives, the self-sensing can only occur between the stress-sensing molecules, and any damage done to the bulk material cannot be sensed, the fluorescent nature only serving as a signal to the damage. Another potential drawback of utilizing mechanophores as additives is the significant lowering of the glass transition temperature of the system, which can limit the temperature window in which the composite materials can be used. Further, when a mechanophore is attempted to be incorporated into polymer chains, it requires an appropriate position relative to the polymer backbone. This is because mechanophores can only be force-activated if the force can be effectively transferred through the bulk material to individual chains, then to the cleavable bonds on the mechanophore units.

To overcome these issues, novel approaches of direct covalent grafting of photoactive mechanophore units into an epoxy matrix (a two-part network polymer) are disclosed herein to create a self-sensing thermoset network nanocomposite, linked by both epoxide and mechanophore bonds. Two routes of grafting mechanophore units into an epoxy system to form a self-sensing nanocomposite were explored, including grafting the mechanophore precursor molecule cinnamamide to the epoxy resin, with subsequent hardener addition and ultraviolet curing to form mechanically sensitive cyclobutane rings, and separately grafting the solution-made mechanophore di-cinnamamide to the epoxy resin to allow for maximum cyclobutane concentration in the formed nanocomposites. With both molecules, the free amine groups can directly bond to epoxy resin to covalently incorporate themselves within the thermoset network to form a self-sensing nanocomposite. Under a compressive force, the cyclobutane rings in the mechanophore units break, increasing the overall fluorescence, which can then be correlated to the applied stress.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the disclosed invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

2. Compositions

Disclosed herein are compositions that include a thermosetting polymer network and a mechanophore. The mechanophore is covalently bonded to the thermosetting polymer network. The presence of the mechanophore within the composition can allow for detection of mechanical load and/or stress applied to the composition. For example, the mechanophore may change (e.g., optically) upon application of a mechanical load to the composition in excess of a predetermined level. The change may be measured by fluorescence emission of the mechanophore upon application of the mechanical load.

In some embodiments, the predetermined level is a property of the composition, such as the yield point of the composition. In some embodiments, the predetermined level corresponds to a strain value of at least 0.5% being applied to the composition, at least 1% being applied to the composition, at least 2% being applied to the composition, at least 3% being applied to the composition, at least 4% being applied to the composition, at least 5% being applied to the composition, at least 6% being applied to the composition, at least 7% being applied to the composition, at least 8% being applied to the composition, at least 9% being applied to the composition, at least 10% being applied to the composition, at least 15% being applied to the composition, or at least 20% being applied to the composition.

In addition, while the presence of the mechanophore can instill advantages to the composition, it can do so without negatively impacting the physical properties of the composition. As detailed above, the inclusion of mechanophores as additives within a composition may negatively impact the properties of the composition, such as its $T_g$. However, the disclosed compositions covalently bonding the mechanophore to the thermosetting polymer network may insignificantly impact the $T_g$ of the composition. For example, the composition may have a $T_g$ of about 1° C. to about 10° C. lower than the $T_g$ of the thermosetting polymer network without the mechanophore as measured by DSC, such as about 2° C. to about 8° C. or about 4° C. to about 7° C. lower than the $T_g$ of the thermosetting polymer network without the mechanophore as measured by DSC.

A. Mechanophore

Mechanochemistry is an area of chemistry that involves the use of mechanical force to induce a chemical change. Mechanochemistry offers alternative routes to obtain desired products, as the use of mechanically active groups can allow for reaction pathways not possible with traditional thermal or light-driven reactions. Mechanochromism refers to the specific phenomena of mechanically induced color changes, generally caused by incorporated chromophores or fluorophores, which show a visible light or fluorescent response to a mechanical force, respectively. Fluorescence may occur when a suitable excitation wavelength of light excites the fluorophore from its electronic ground state to an electronic excited state to form an excimer. The electronic excited state can then quickly fall back down to the ground state, releasing less energy that was initially applied, resulting in a photon of a longer wavelength of light, or the measured fluorescence emission. For mechanochromic species, different excimer complexes can form based on the different interactions of the fluorophore molecules when subject to induced stress or strain. These excimer confirmations can be induced by changes in the local mechanical environment, and thus these fluorophores can act as a molecular sensor for applied strains, by way of changes in their fluorescent emission.

Mechanophores, as referred to herein, are molecular units that undergo selective bond scission in response to an external force to provide a measureable signal to correlate to the applied force for a targeted chemical response. The bond scission mechanism for mechanophore activation is what separates this group from the above described mechanochromic materials, as the chemical structure of latter chromophores/fluorophore tags remains intact during the mechanical response. Mechanisms for various mechanophores include, but are not limited to, targeted homolytic cleavage of the weaker bonds in a structure, dative bond scission for specialized bonds with inorganic elements, cycloreversion to break a cyclic ring and revert back to two separate molecules, and electrocyclic ring opening in which then ring opening retains the single molecule structure.

Photoirradiation as a reaction pathway can be a selective, targeted excitation with UV-vis irradiation that can initiate chemical reactions not otherwise possible thermally, or by other methods, or reactions which would have less efficiency due to unwanted side reactions or other effects. Cycloaddition via photodimerization is a mechanism, in which certain monomeric structures can dimerize into cycloalkane rings, such as cinnamoyl groups into cyclobutane via [2+2] cycloaddition. As disclosed herein, cyclobutane rings formed from the photodimerization of cinnamoyl groups can also act as mechanophore units, with the strained rings reverting back to their fluorescent, monomeric cinnamoyl form after an applied stress.

Cyclobutane mechanophores can go through cycloreversion to create two separate alkene containing molecules in response to the applied stress. Additionally, cyclopropane can be used as a mechanophore due to the greater strained nature of the ring, generally following an electrocyclic ring opening mechanism due to the small structure of the ring.

Accordingly, the mechanophore may be derived from cinnamamide. In some embodiments, the mechanophore comprises

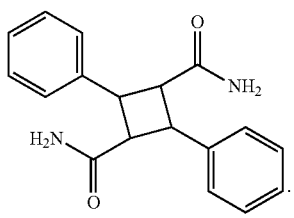 [SMILES: NC(=O)C1C(c2ccccc2)C(C(N)=O)C1c1ccccc1]

In some embodiments, the mechanophore is

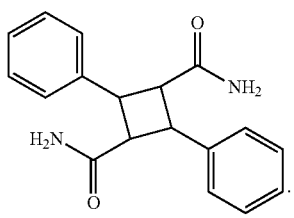 [SMILES: NC(=O)C1C(c2ccccc2)C(C(N)=O)C1c1ccccc1]

The mechanophore may be referred to as a mechanophore moiety. In some embodiments, the mechanophore moiety comprises

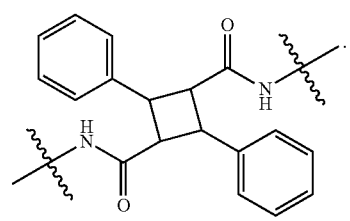 [SMILES: *NC(=O)C1C(c2ccccc2)C(C(=O)N*)C1c1ccccc1]

In some embodiments, the mechanophore moiety is

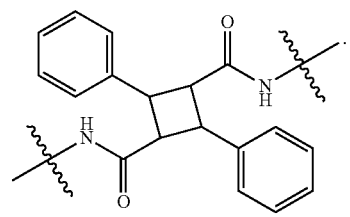 [SMILES: *NC(=O)C1C(c2ccccc2)C(C(=O)N*)C1c1ccccc1]

In some embodiments, the mechanophore does not include a spiropyran or a spirooxazine. Accordingly, in some embodiments, the composition does not include a spiropyran or a spirooxazine.

As mentioned above, the mechanophore is covalently bonded to the thermosetting polymer network. The mechanophore may be covalently bonded to the thermosetting polymer network through an amine of the mechanophore and an epoxide of the thermosetting polymer network. In some embodiments, the mechanophore is bonded to the thermosetting polymer network via two amine bonds. In an exemplary embodiment, the mechanophore is a cinnamamide dimer di-substituted with an epoxy resin diglycidyl ether of bisphenol F. For example, the composition may include a polymer having units derived from drides, polyphenols, polyfunctional alcohols, and polyfunctional thiols. The polyfunctional hardener may include at least 2 functional groups that are reactive with an epoxide, at least 3 functional groups that are reactive with an epoxide, at least 4 functional groups that are reactive with an epoxide,

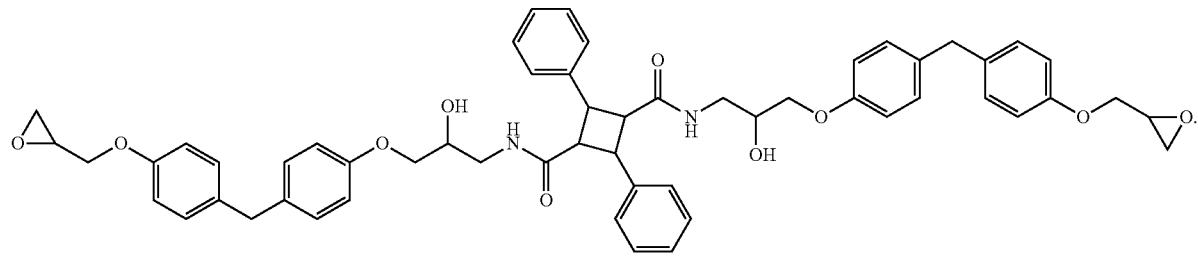 [SMILES: O=C(NCC(O)COc1ccc(Cc2ccc(OCC3CO3)cc2)cc1)C1C(c2ccccc2)C(C(=O)NCC(O)COc2ccc(Cc3ccc(OCC4CO4)cc3)cc2)C1c1ccccc1]

As described above, the mechanophore can optically change upon the application of a mechanical load in excess of a predetermined level. The optical change may be measured by fluorescence emission of the mechanophore upon application of the mechanical load to the composition.

The mechanophore may be present in the composition at varying amounts. For example, the mechanophore may be present at about 1 weight % (wt %) to about 30 wt %, such as about 1 wt % to about 25 wt %, about 2 wt % to about 20 wt %, about 4 wt % to about 18 wt %, or about 5 wt % to about 15 wt %. In some embodiments, the mechanophore is present at greater than 1 wt %, greater than 2 wt %, greater than 3 wt %, greater than 4 wt %, or greater than 5 wt %. In some embodiments, the mechanophore is present at less than 30 wt %, less than 25 wt %, less than 20 wt %, or less than 15 wt %.

B. Thermosetting Polymer Network

The thermosetting polymer network refers to a branched and/or crosslinked thermosetting polymer that once formed (e.g., via curing) becomes set in its shape. This is in contrast to thermoplastic polymers that can be reshaped when reheated to a certain temperature. Examples of compounds and/or polymers that can form thermosetting polymer networks (e.g., thermosetting polymer network precursors) include, but are not limited to, acrylic resins, polyurethanes, epoxy resins, and polyester resins. In some embodiments, the thermosetting polymer network includes or is derived from a polyurethane, an epoxy resin, a polyester resin, or combinations thereof.

In some embodiments, the thermosetting polymer network includes or is derived from an epoxy resin. Epoxy resins refer to low molecular weight pre-polymers, higher molecular weight polymers, or both that contain at least two epoxide groups. Examples of epoxy resins include, but are not limited to, bisphenol A epoxy resin, bisphenol F epoxy resin, and novolac epoxy resin. The thermosetting polymer network may be derived from compounds and/or polymers having epoxide functional groups, such as at least 2 epoxide functional groups, at least 3 epoxide functional groups, at least 4 epoxide functional groups, or at least 5 epoxide functional groups. In some embodiments, the thermosetting polymer network is derived from a compound and/or polymer having 2 to 6 epoxide functional groups.

Generally, epoxy resins are cured by polyfunctional hardeners (which also can be referred to as a curing agent or a crosslinking agent) to form a thermosetting polymer network. Examples, of polyfunctional hardeners include, but are not limited to, polyfunctional amines, cyclic anhyor at least 5 functional groups that are reactive with an epoxide. In some embodiments, the polyfunctional hardener includes 2 to 5 functional groups that are reactive with an epoxide.

In some embodiments, the polyfunctional hardener is a polyfunctional amine. The polyfunctional amine may have at least 2 amine groups, at least 3 amine groups, at least 4 amine groups, or at least 5 amine groups. In some embodiments, the polyfunctional amine has 2 to 5 amine groups.

The disclosed thermosetting polymer networks may be formed from different combinations of epoxy resins and polyfunctional hardeners as described above. In some embodiments, the thermosetting polymer network is derived from digycidylether of bisphenol F and a polyfunctional amine. In some embodiments, the thermosetting polymer network is derived from digycidylether of bisphenol F and diethylenetriamine.

The thermosetting polymer network may be present in the composition at varying amounts. For example, the thermosetting polymer network may be present at about 70 wt % to about 99 wt %, such as about 75 wt % to about 95 wt %, about 80 wt % to about 99 wt %, about 85 wt % to about 99 wt %, or about 85 wt % to about 95 wt %. In some embodiments, the thermosetting polymer network is present at greater than 70 wt %, greater than 75 wt %, greater than 80 wt %, greater than 85 wt %, or greater than 90 wt %. In some embodiments, the thermosetting polymer network is present at less than 99 wt %, less than 98 wt %, less than 97 wt %, less than 96 wt %, or less than 95 wt %.

3. Methods of Making the Compositions

Also disclosed herein are methods of making the compositions. The method may include preparing a mixture that includes a thermosetting polymer network precursor, a mechanophore precursor and a solvent. The thermosetting polymer network precursor may be a compound that can react with a polyfunctional hardener to form the thermosetting polymer network. For example, the thermosetting polymer network precursor may comprise an epoxide functional group, which can react with the mechanophore precursor, the mechanophore, the polyfunctional hardener, or a combination thereof. In some embodiments, the thermosetting polymer network precursor comprises an epoxide resin. In some embodiments, the thermosetting polymer network precursor is an epoxide resin. The mechanophore precursor may be a compound, such as cinnamamide, that can be further modified and/or reacted to form the mechanophore.

Accordingly, the mechanophore may comprise cinnamamide. In some embodiments, the mechanophore precursor is converted to the mechanophore prior to adding to the mixture. In addition, the solvent may be an organic solvent, such as dichloromethane.

The mixture may then be reacted to provide an intermediate composition. Reacting the mixture may be performed at varying temperatures and times which are suitable to provide the intermediate composition. For example, reacting the mixture may be performed at about 20° C. to about 60° C. for about 1 h to about 10 h. In some embodiments, reacting the mixture is performed at about 40° C. for about 4 h. In embodiments where the mechanophore precursor is converted to the mechanophore prior to adding to the mixture, the intermediate composition may include such as the yield point of the substrate, composition of both. In some embodiments, the predetermined level corresponds to a strain value of at least 0.5% being applied to the substrate, at least 1% being applied to the substrate, at least 2% being applied to the substrate, at least 3% being applied to the substrate, at least 4% being applied to the substrate, at least 5% being applied to the substrate, at least 6% being applied to the substrate, at least 7% being applied to the substrate, at least 8% being applied to the substrate, at least 9% being applied to the substrate, at least 10% being applied to the substrate, at least 15% being applied to the substrate, or at least 20% being applied to the substrate.

In another aspect, disclosed are methods of monitoring stress on a substrate. The method may include forming a substrate comprising the disclosed composition, and using

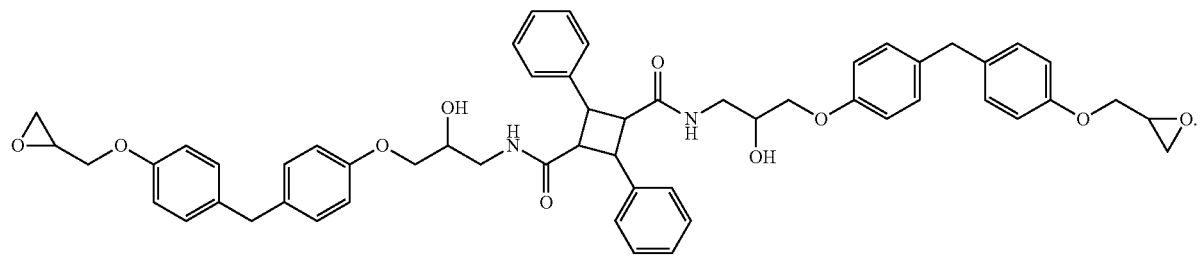 [SMILES: O=C(NCC(O)COc1ccc(Cc2ccc(OCC3CO3)cc2)cc1)C1C(c2ccccc2)C(C(=O)NCC(O)COc2ccc(Cc3ccc(OCC4CO4)cc3)cc2)C1c1ccccc1]

Following providing the intermediate composition, the solvent may be removed therefrom by any suitable method known within the art, such as under reduced pressure. The polyfunctional hardener, such as a polyfunctional amine, can then be added to the intermediate composition and allowed to react to provide a composition comprising a thermosetting polymer network and a mechanophore covalently bonded to the thermosetting polymer network as disclosed herein.

In some embodiments, the intermediate composition and the polyfunctional hardener are mixed until homogenous, and then may be allowed to cure overnight to provide disclosed compositions. In embodiments where the mechanophore precursor is added to the mixture (rather than the mechanophore), the intermediate composition and polyfunctional hardener may be further cured with UV-365 nm light, which can allow the formation of the mechanophore.

Generally, the above-description regarding the thermosetting polymer network, the epoxy resin, the mechanophore, and the polyfunctional hardener can also be applied to the methods of making the disclosed compositions. For the purposes of brevity, this description will not be repeated here.

4. Uses of the Compositions

Due to the advantages provided by the disclosed compositions, they can be used in a variety of different applications. For example, thermosets find ubiquitous use due to their excellent mechanical and physical properties, including in printed circuit boards, high-performance adhesives, military personal protective equipment (PPE), and various marine, aerospace, and other applications.

In one aspect, disclosed is a substrate comprising the disclosed composition, wherein the composition optically changes upon application of a mechanical load to the substrate in excess of a predetermined level.

In some embodiments, the predetermined level corresponds to a property of the substrate, composition or both, the substrate. Use will be dependent on the intended function of the substrate. For example, if the substrate is intended to be used for PPE applications, a potential use may be receiving a blunt force to the substrate. Following use of the substrate, an optical property of the substrate may be measured and compared to the same optical property of the substrate measured prior to use of the substrate, wherein comparing the measurement of the optical property is correlated to a stress applied to the substrate. In embodiments where no stress has been applied to the substrate during its use, there will be no change in the measured optical property. In embodiments where a stress has been applied to the substrate during its use, there may be a change in the measured optical property. The optical property measured of the substrate can be fluorescence.

5. EXAMPLES

Example 1: Stress-Sensing Thermoset Polymer Network Via Grafted Cinnamoyl/Cyclobutane Mechanophore Units in Epoxy Materials & Methods Materials. Cinnamamide (Cinn, Sigma-Aldrich), diethyl ether (VWR International), and deuterated dimethyl sulfoxide (DMSO-$d_6$, Cambridge Isotope Laboratories) were used as received. The epoxy resin FS-A23 (digycidylether of bisphenol F, DGEBPF) and epoxy hardener FS-B412 (diethylenetriamine, DETA) were purchased from Epoxy Systems Inc. and used as received.

Synthesis of Dimeric Cinnamamide (Di-Cinn) and Chemical Characterization: To synthesize di-cinnamamide, 2 g of cinnamamide were dissolved in 40 mL of diethyl ether and the mixture was homogenized via magnetic stirring and under a nitrogen purge. The solution was then photoirradiated with a 302 nm wavelength UV lamp (UVP, UVM-28), with a light density of approximately 1300 μW cm$^{-2}$ at a distance of 3 cm, for two days. A white precipitate formed, which was washed with diethyl ether by gravity filtration to remove the brown cinnamamide monomer, until the bottom solution was clear. The product was then dried to remove excess solvent. 1H NMR (400 MHz, DMSO-$d_6$) δ 7.53-7.07 (10H, m), 6.55 (4H, d), 3.29 (4H, s).

$^1$H Nuclear Magnetic Resonance (NMR) spectra were taken with a Bruker 400 MHz NMR spectrometer. For the NMR samples, approximately 5 mg of the sample was dissolved in 750 μL of DMSO-$d_6$. Fourier Transform Infrared (FTIR) spectra were taken under vacuum in a Bruker IFS 66v/S FTIR spectrometer equipped with a Pike Diamond ATR (Attenuated Total Reflectance) accessory. Emission spectra were collected with a Horiba Scientific FluoroLog-3 Spectrofluorometer with an excitation wavelength of 350 nm, and all slits set at 1 nm. Microscopic morphologies of the surface of the epoxy samples were taken with a FEI/Philips XL30 Environmental FEG Scanning Electron Microscope (SEM). The chemical structures were drawn with MarvinSketch.

Preparation and Characterization of Mechanophore-Embedded Epoxy Matrix Composites:

To form the studied nanocomposites consisting of 10 wt % cinnamamide or 10 wt % di-cinnamamide in 5 g total epoxy, each were first reacted with the resin to ensure the covalent bond formation. 0.5 g of cinnamamide or di-cinnamamide were added to 3.704 g of epoxy resin (digycidylether of bisphenol F, DGEBPF) and 20 mL of dichloromethane. This mixture was then heated at 40° C. for 4 hr under a nitrogen purge and magnetic stirring to allow for the reaction between the epoxide rings and the amine groups. After the reaction was completed, the cinnamamide reaction solution turned fluorescent opaque yellow while the di-cinnamamide reaction solution was white and opaque. The dichloromethane solvent was then removed under reduced pressure and 0.796 g of hardener (diethylenetriamine, DETA) was added to each functionalized resin mixture (4.204 g total). The hardener/resin/mechanophore weight ratio was calculated according to the manufacturer's recommendations and the epoxide/amine equivalent weight. These mixtures were then impeller mixed at 200 rpm for 5 min at room temperature until homogenous. The mixtures were then poured into silicone rubber molds sprayed with a mold release agent and allowed to cure overnight at room temperature, with the cinnamamide epoxy being UV cured for 4 hrs under 365 nm light (UVP, UVLMS-38) prior to leaving in darkness to complete the curing. Neat epoxy samples were prepared in a similar manner with a 100:27 ratio of resin to hardener.

After simple machining, the average dimensions of the samples for the compression test were 3×4×8 mm and 2×12×35 mm for the Dynamic Mechanical Analyzer (DMA) tests. A TA Instruments Q20 Differential Scanning Calorimeter (DSC) was used to determine the glass transition temperature ($T_g$) of the epoxy samples in aluminum Tzero pans with lids under nitrogen, with air (an empty pan and lid) used as the reference. The sample was first heated to 70° C. to eliminate any thermal history, cooled down to −20° C., then heated to 120° C. to determine the $T_g$, with all heating and cooling rates set at 10° C./min. A TA Instruments Thermogravimetric Analyzer (TGA) Q500 was used to determine the decomposition temperatures ($T_d$) under nitrogen. Each sample was placed in a tared platinum crucible and heated from 25 to 600° C. at a heating rate of 10° C. min$^{-1}$. A TA Instruments Q800 Dynamic Mechanical Analyzer (DMA) was used to measure the storage modulus, loss modulus, and tan delta for the epoxy samples over a temperature range and to calculate the crosslink density. The multi-frequency/strain method was used with the single cantilever clamp and a frequency of 1 Hz under amplitude control. The temperature was ramped from 25 to 120° C. at a heating rate of 5° C./min, with the strain amplitude set at 25 μm. The characteristic temperatures and moduli values from DSC, TGA, and DMA were found using the built in functions in the TA Instruments Universal Analysis software. A TestResources 800 L Compression Test System was used to compress the samples to different strains and obtain stress-strain plots for the epoxy samples. A small amount of petroleum jelly was applied to the samples to minimize their friction with the compression plate, and prevent unwanted shearing. The tests were run in displacement control in the longitudinal direction at a loading rate of 1 mm/min and conducted at room temperature. The fluorescence generation from the compressed epoxy samples was observed under a Nikon Eclipse TE300 inverted video fluorescence microscope, by excitation under 340-380 nm UV light, with a filter cube to capture the emission of light between 500-550 nm. All images were taken with a black-and-white camera and with the same intensity of light, gain, and exposure time. The Image J software package was used to quantify the fluorescence intensity of the images taken. Every image was first converted to an 8-bit image and then the "Measure" function was used to calculate the integrated intensity for the selected area of the image; this is through the software taking the sum of the pixel values in the image, and then averaging the intensity at each point. The 8-bit gray scale fluorescence images from the fluorescence microscope were subsequently pseudocolored green with ImageJ with the built-in "Green" LUT, and the fluorescent images were all further enhanced by increasing both the brightness and contrast by 40% for better viewing.

Results & Discussion

Formation of the Mechanophore-Grafted Self-Sensing Thermoset Network Polymer.

The mechanophore precursor chosen was cinnamamide (Cinn, chemical structure in FIG. 1A inset left), as its amine group can covalently bond to the epoxy resin chosen (diglycidyl ether of bisphenol F, DGEBF), in a similar matter to the crosslinking of the resin with the chosen hardener (diethylenetriamine, DETA) in the neat epoxy system. Cinnamamide can form a cyclobutane type dimer (di cinnamamide, Di-Cinn, chemical structure in FIG. 1B inset left) under UV photoirradiation via [2+2] cycloaddition. Thus two routes are studied in this work for the mechanophore covalent incorporation into an epoxy matrix, the first being the reaction of the cinnamamide mechanophore precursor with DGEBF to ensure covalent bond formation, with subsequent hardener addition.

The epoxy mixture is then UV cured so that the cyclobutane mechanophore units can be formed via photodimerization, while the conventional resin-hardener curing is taking place. The second route is to first form di-cinnamamide in solution under UV light, then to react it with DGEBF, with subsequent hardener addition and conventional epoxy bond formation. In this second method, it was hypothesized that more cyclobutane rings would be present in the final nanocomposite, as Di-Cinn is theoretically 100% dimerized prior to addition, and was confirmed via the amount of initial fluorescence of the composite for the same weight percentage of mechanophore used. In this route, the penetration depth for curing an epoxy sample and the UV curing efficiency do not play a role. In the Cinn-containing composite, this dimerization occurs in the viscous epoxy resin-hardener solution, and thus there is competition between the two types of crosslink formation as well as a physical impedance for the cinnamoyl groups to find each other in the mixture and dimerize, compared to simple dimerization in solution.

To form the studied nanocomposites, the cinnamamide dimer was first synthesized by dissolving cinnamamide in a diethyl ether under magnetic stirring and a nitrogen purge. The solution was then photoirradiated with a 302 nm wavelength UV lamp for two days to carry out the [2+2] cycloaddition for the formation of the cyclobutane rings. The white Di-Cinn precipitate was then washed and dried to obtain a pure product. To form the studied nanocomposites consisting of covalently bonded 10 wt % cinnamamide or 10 wt % di-cinnamamide in epoxy, each were first reacted with the resin to ensure the covalent bond formation between the amine hydrogens in Cinn or Di-Cinn and the epoxide rings of DGEBF. This was performed by adding cinnamamide or di-cinnamamide to DGEBPF with dichloromethane as a solvent. This mixture was then heated at 40° C. for 4 hr under a nitrogen purge and magnetic stirring to promote the reaction between the epoxide rings and the amine groups. The dichloromethane solvent was then removed under reduced pressure and the diethylenetriamine hardener was added to each functionalized resin mixture, with the hardener/resin/mechanophore weight ratio calculated according to the manufacturer's recommendations and the epoxide/amine equivalent weight. The amount of mechanophore vs. epoxide crosslinks should be balanced in order to allow for the desired sensing signal while not depressing the thermal and mechanical properties of the matrix. These mixtures were then impeller mixed at room temperature until homogenous and subsequently poured into silicone rubber molds and allowed to cure overnight at room temperature, with the cinnamamide epoxy being UV cured for 4 hr under 365 nm light prior to leaving in darkness to complete the curing. Neat epoxy samples were prepared in a similar manner with a 100:27 ratio of resin to hardener.

Figure 1B:
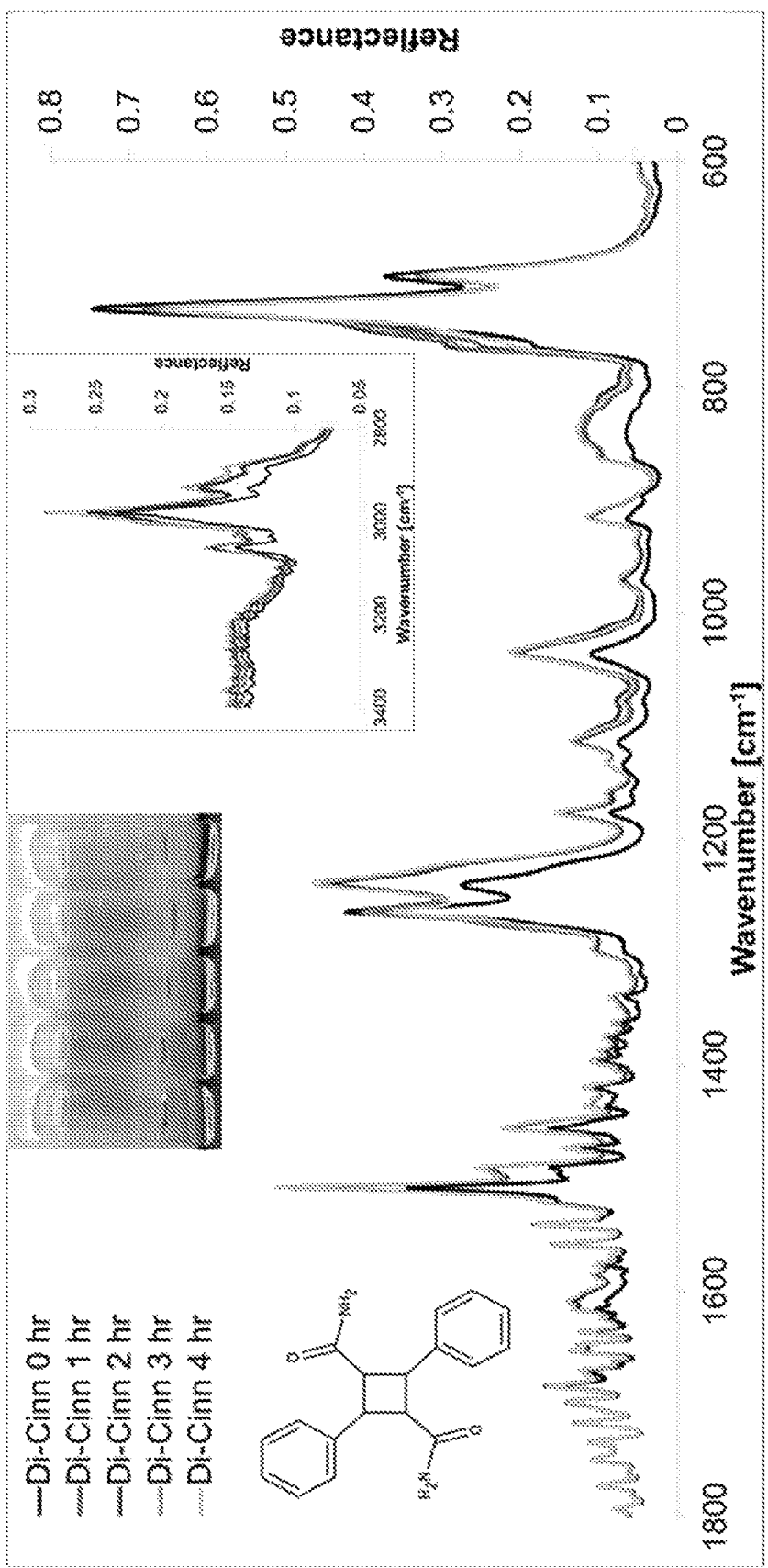

The chemical structure shows a cinnamamide dimer di-substituted with DGEBF, with the resin containing two active epoxide ring end groups than can covalently bond with an amine hydrogen active site. Theoretically, each amine from a cinnamamide group has two free active hydrogen sites that could participate in this reaction (with 4 total for a di-cinnamamide molecule), but a sterical hindrance of the reaction should be taken into account. Because the cinnamamide or di-cinnamamide first reacts with the resin molecule, there is a higher probability for increased covalent bonding to occur (compared to if this reaction happened in the epoxy in situ), however there is likely a higher substitution occurring with cinnamamide compared to di-cinnamamide, due to the steric hindrance. Thus, to evaluate the amount of substitution, ATR-FTIR was performed on the reaction solutions of cinnamamide/di-cinnamamide and DGEBF in dichloromethane, as seen in FIGS. 1A and B, respectively. Interestingly, in the reaction solutions for either chemistry, the primary amine hydrogen peaks representative of Cinn and Di-Cinn at 3367 and 3157 $cm^{-1}$ (seen in FIG. 2A) are not present in the FTIR scans. However, there are other important functional group peaks present to evaluate the mechanophore-resin grafting over the reaction time. As the ATR-FTIR accessory was used on these samples, some quantitative analysis regarding the change in peak height over the reaction time can be made. For both the cinnamamide- and di-cinnamamide-resin reaction FTIR spectra in FIGS. 1A and B, important functional group peak changes over reaction time include a slight reduction of the 730 and 700 $cm^{-1}$ peaks for the aromatic C—H bend, attributed to the change in aromaticity upon grafting; the dramatic increase of the peak at 1032 $cm^{-1}$, for the formation of new C—OH bonds upon opening of the epoxide rings; an increase at 1175 $cm^{-1}$, again for the new C—OH stretch; a dramatic increase near 1237 $cm^{-1}$ for the C—O—C ether stretch in DGEBF change in conjugation; a decrease at 1265 $cm^{-1}$ for the removal of the C—O stretch in the epoxides; an increase at 1454 $cm^{-1}$ for the C—H aliphatic hydrogens; and increases at 1490, 1508, and 1606 $cm^{-1}$ for the benzene ring, due to its change in conjugation over the reaction time. In only the cinnamamide-resin reaction FTIR spectra, there is a dramatic reduction of the peak at 1140 $cm^{-1}$, which can be correlated to the loss of the C—N amine peak, specifically for primary amines.

In the inset spectra in FIGS. 1A and B showing the wavenumbers from 3400 and 2900 $cm^{-1}$, there is an overlaying of the peaks for the C—H bonds of the aromatics, alkanes, and epoxide rings. For both cinnamamide and di-cinnamamide, there is an increase of the 3055, 2980, and 2924 $cm^{-1}$ peaks, and for cinnamamide, there is a clear removal of the 2976 and 3015 $cm^{-1}$ peaks after the reaction is completed. As the conjugation and interactions of the molecules can obscure the specific identification of theses peaks, the simple change in peak intensity and the removal of certain peaks in this region can provide the additional evidence of the procession of the mechanophore-resin reaction, with the more defined evidence from the spectra at the smaller wavenumbers.

A macroscopic viewing of the functionalization is additionally seen in the inset images of FIGS. 1A and B, which shows diluted reaction solution aliquots taken at 0, 1, 2, 3, and 4 hr from left to right. At 0 hr, before the reaction occurred, both Cinn and Di-Cinn reaction solutions were colorless, due to the solubility of both in dichloromethane. However, after only 1 hr reaction, cinnamamide reaction solution turned fluorescent opaque yellow, with the amount yellow color increasing as the reaction proceeded. This color change is a visible signal of the resin-mechanophore functionalization, as the UV fluorescence of the cinnamamide is shifted to the longer visible wavelengths upon reaction with the large resin molecules. The di-cinnamamide reaction solution turned white and opaque as the reaction proceeded, as the functionalized di-cinnamamide resin typically does not have intrinsic fluorescence unless the dimers are broken under a mechanical stress.

Figure 2A:
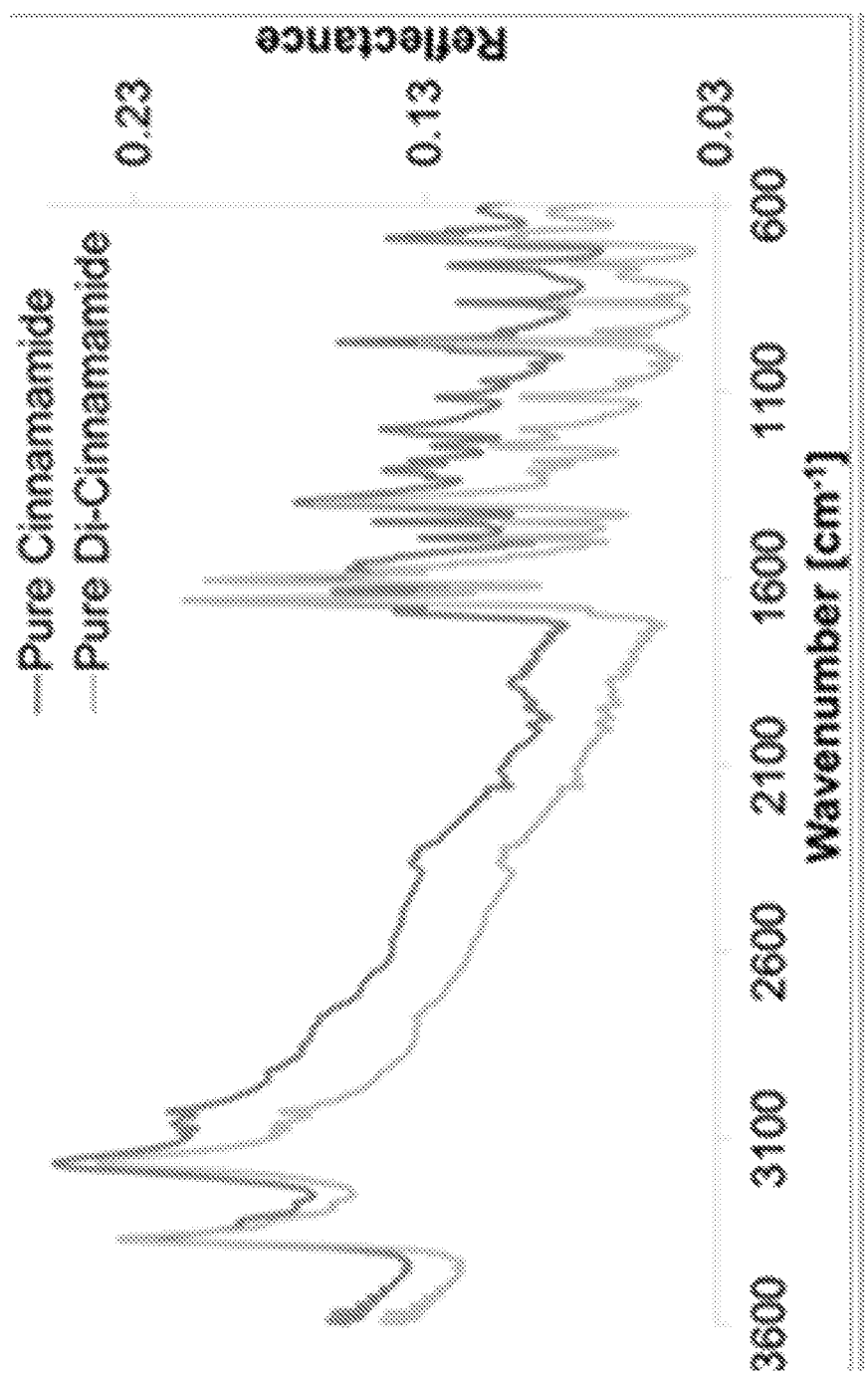
FIGS. 2A-C are varying comparative spectra.

The ATR-FTIR spectra of the pure cinnamamide crystals and di-cinnamamide power can be seen in FIG. 2A, with the important primary amine hydrogen peaks at 3367 and 3157 $cm^{-1}$. Other defining peaks for the spectrum include the C=O carbonyl stretch, and various aromatic peaks, below 1700 $cm^{-1}$. FIG. 2C shows the resulting ATR-FTIR spectra for the neat epoxy, and the 10 wt % Cinn and 10 wt % Di-Cinn epoxy nanocomposites, with the Cinn composite having undergone UV curing. A macroscopic image of the epoxy samples on a light blue background can be seen in the inset of FIG. 2C, with the neat epoxy being translucent, the 10 wt % Di-Cinn epoxy being opaque white, and the 10 wt % Cinn epoxy being opaque yellow; the fluorescent yellow color of the Cinn composite being a visual indicator of its intrinsic fluorescence even before damage is applied, due to the lower amount of cyclobutane formation as a result of UV dimerization in curing epoxy mixture. In the neat and composite epoxy FTIR spectra, the clear, broad —OH peak near 3300 $cm^{-1}$ is present, due to the opening of the epoxide rings during epoxy curing. It should be noted that the 10 wt % Di-Cinn composite spectrum exhibits flattening out of this peak and small peak at 3350 $cm^{-1}$ compared to the other spectra, which can be evidence that the Di-Cinn composite still retains some of its amine hydrogens, likely only moving from the primary amine to the secondary amine form, due to the increase in the steric hindrance in the Di-Cinn-DGEBF reaction, as compared to the Cinn-DGEBF reaction. The smooth nature of the Cinn peak in the region implies that all or most of its amine hydrogens were removed during its reaction with the resin. This difference in the bonding between Cinn and Di-Cinn with the epoxy matrix can result in differences in the mechanochemical response discussed below. Compared to the neat epoxy, the Cinn and Di-Cinn composites exhibit additional peaks at 2916 and 2846 cm$^{-1}$, with an additional peak for Cinn at 2941 cm$^{-1}$. These peaks are representative of newly present aromatic and alkane C—H bonds in the nanocomposites. Other important functional group peaks can be seen below 1700 cm$^{-1}$, and are similar to the peaks discussed above in FIG. 1. Overall, from the ATR-FTIR spectra of the reaction between the cinnamamide and di-cinnamamide and DGEBF, along with the spectra for the final nanocomposites, there is sufficient evidence for the covalent grafting of the mechanophore units into the thermoset epoxy network.

Figure 2B:
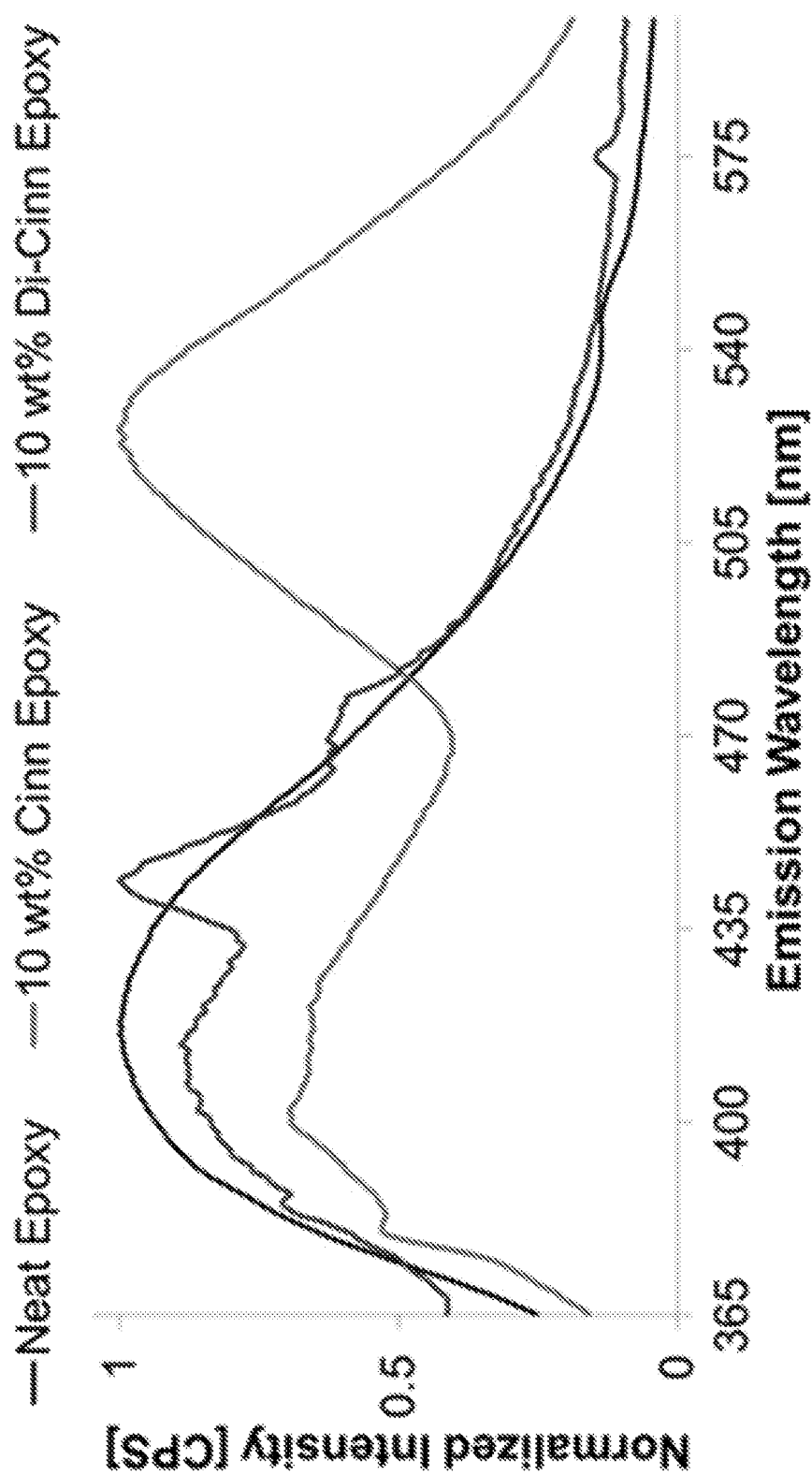
Figure 2C:
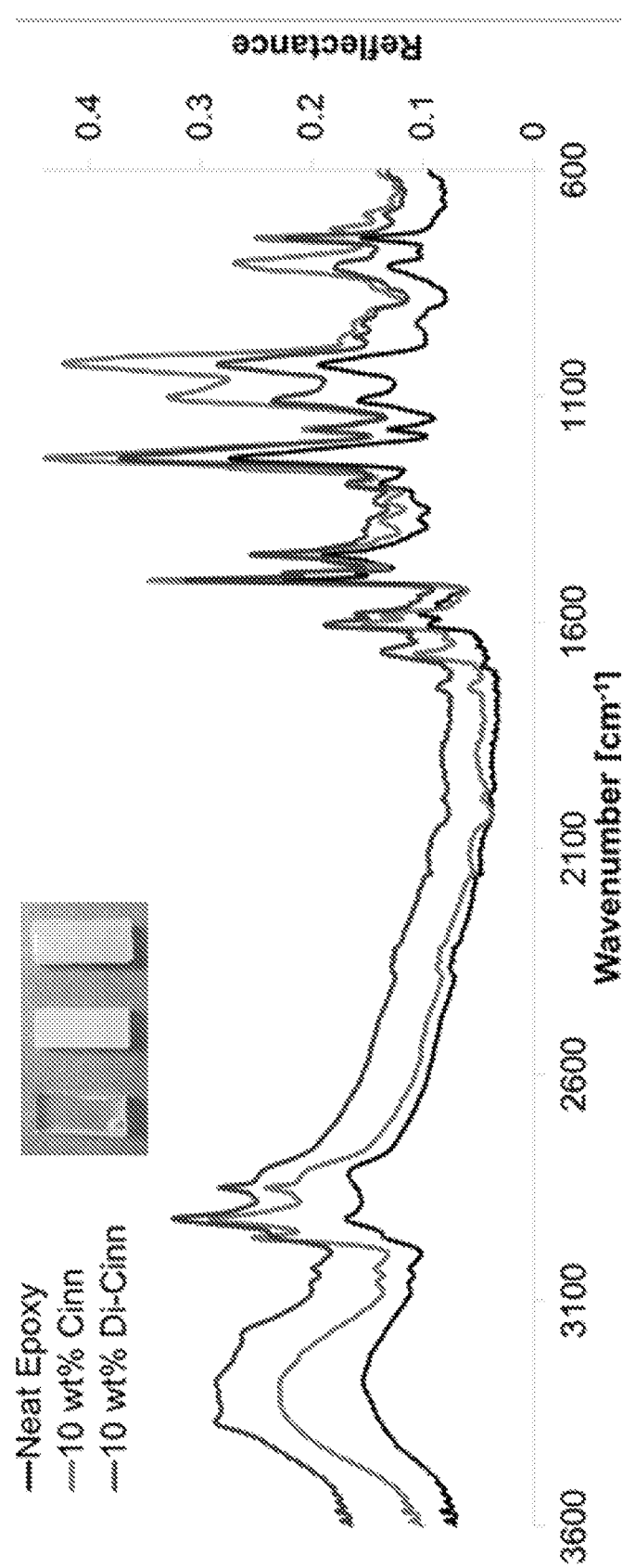

FIG. 2B shows the comparison of the fluorescent emission for the neat epoxy, and the Cinn and Di-Cinn composites under 350 nm excitation, with each curve normalized to its maximum emission. Both the neat and Di-Cinn epoxy samples have similar emission with the maximum between 370 and 470 nm, while the Cinn epoxy has its maximum emission at the higher wavelength range of 500 to 600 nm. This confirms the macroscopic fluorescent visualization of the composite samples mentioned above, and as the emission wavelengths gathered in the subsequent fluorescence microscopy imaging are between 500 and 550 nm, it is expected that the neat and Di-Cinn samples will have a much lower intrinsic or baseline fluorescence as compared to the Cinn samples.

Figure 3A:
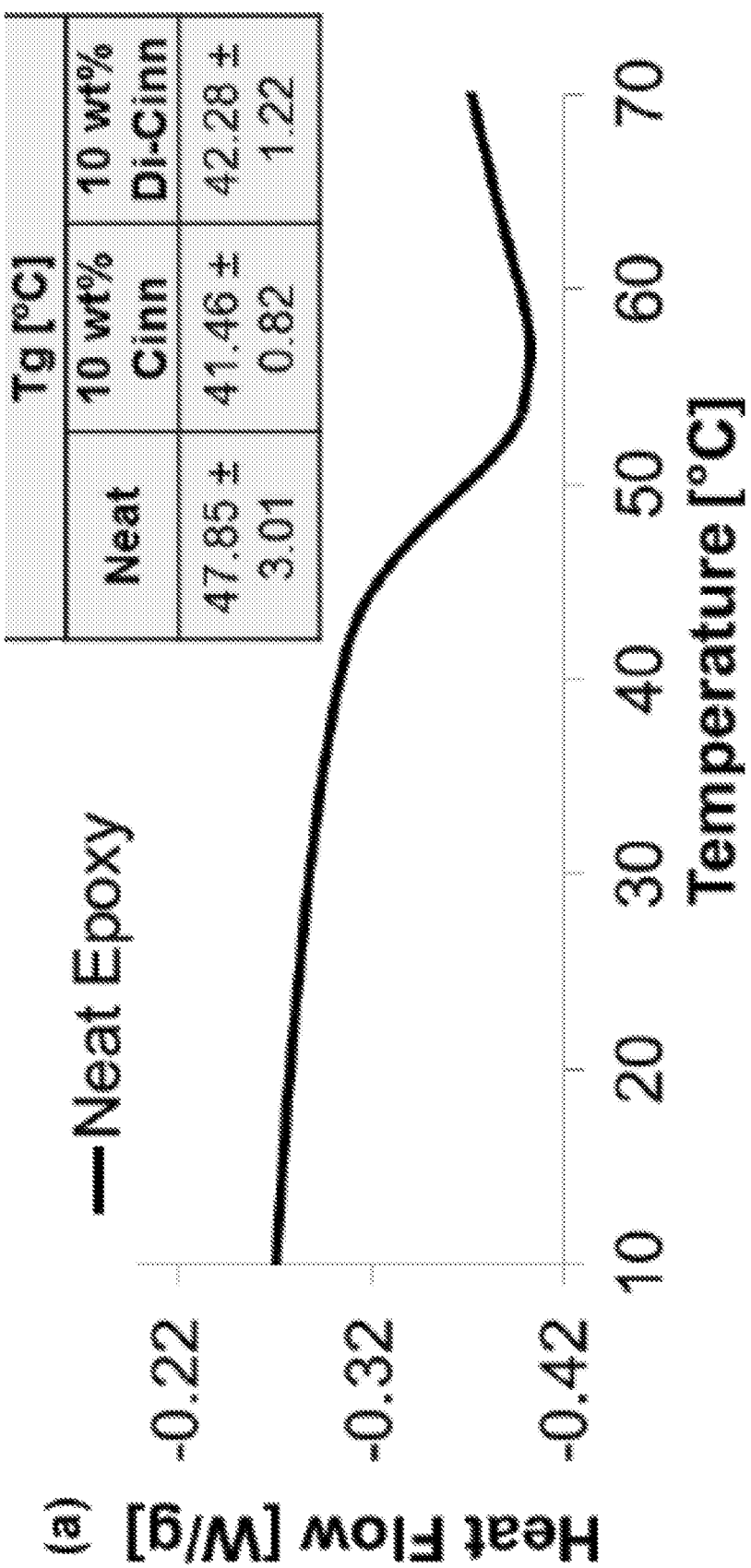
FIGS. 3A-C are differential scanning calorimetry (DSC) analysis and scanning electron microscopy (SEM) analysis of exemplary compositions.
Figure 3B:
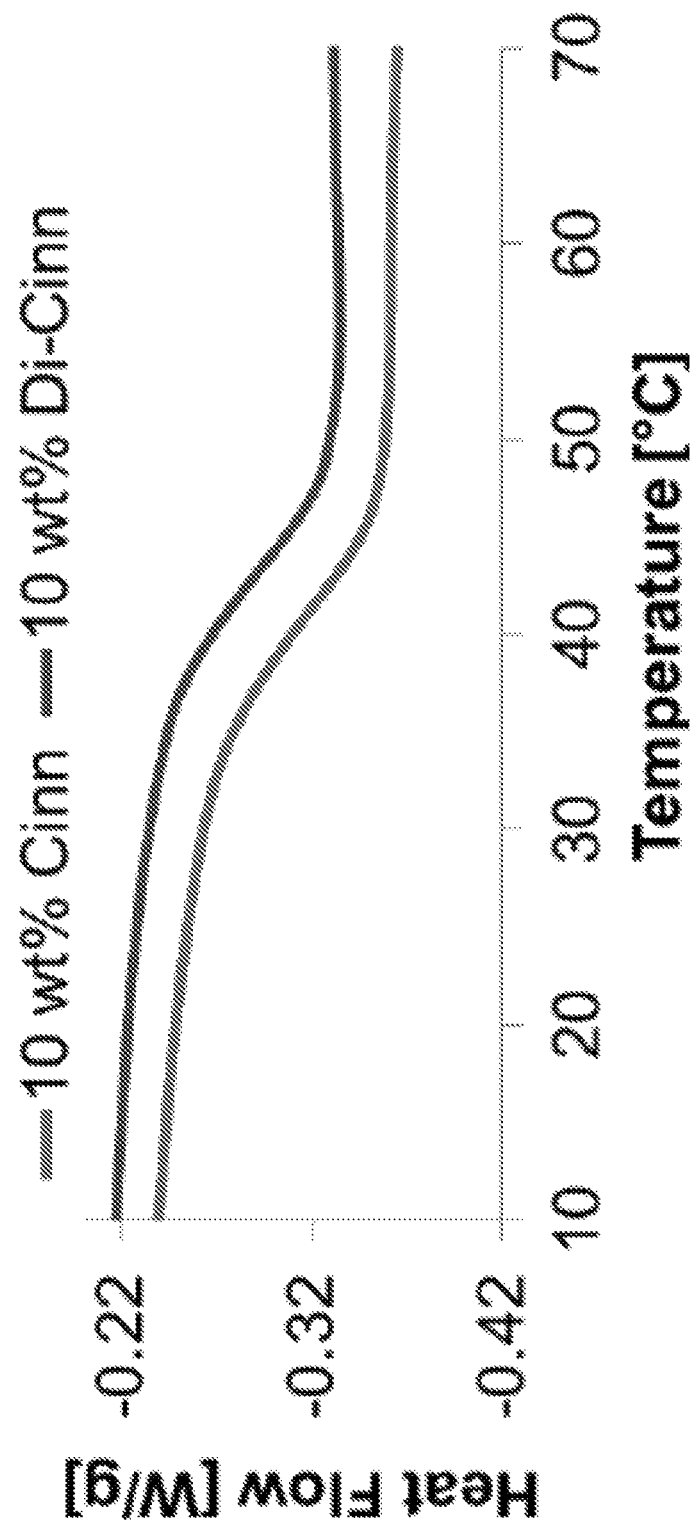
Figure 3C:
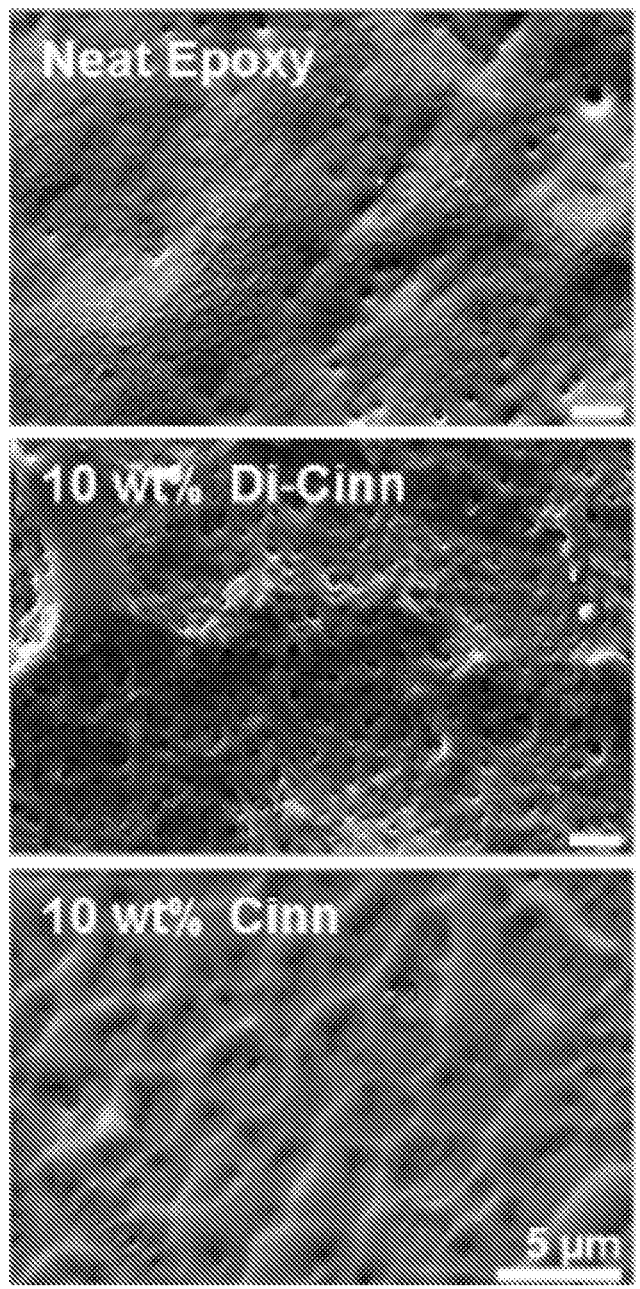

Effects of Mechanophore-Grafting on the Nanocomposite Material Properties:

As the newly formed nanocomposites feature covalent incorporation of the mechanophore units, their effect on the material properties was evaluated. Differential Scanning Calorimetry (DSC) was used to determine the glass transition temperature ($T_g$) of the neat and mechanophore incorporated samples. A representative DSC scan for the neat epoxy can be seen in FIG. 3A, with scans for the 10 wt % Cinn and Di-Cinn composites in FIG. 3B. The $T_g$ values were calculated at the step transition in the curves with the TA Universal Analysis software. The average $T_g$ values over 4 runs were 47.85±3.01° C., 41.46±0.82° C., and 42.28±1.22° C., for the neat, 10 wt % Cinn, and 10 wt % Di-Cinn samples, respectively. This results in a decrease of the $T_g$ from the neat of approximately 6° C. for both the mechanophore nanocomposites. This $T_g$ depression can be expected as the newly formed mechanophore bonds are not as thermally stable as the neat epoxy network, however a 6° C. lowering is relatively low compared to other work regarding mechanophore incorporated composites. FIG. 3C shows SEM images of the neat and composite samples, with some difference in the surface morphology observed, but not a significant enough difference to imply phase separation. Additionally, as the DSC scan only reported one $T_g$, it is additionally confirmed that the mechanophore units are successfully grafted and miscible with the matrix.

Figure 4A:
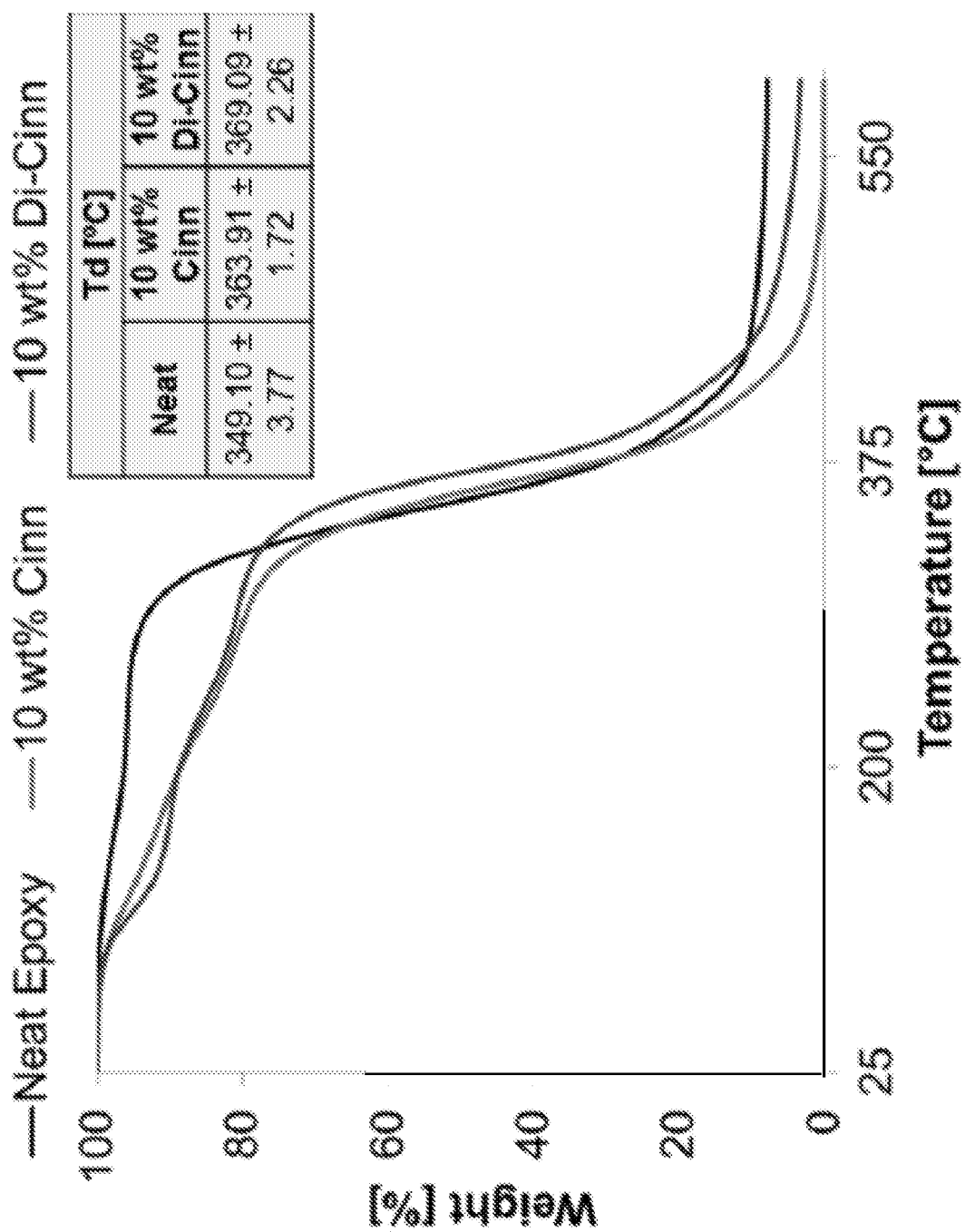
FIGS. 4A-B are thermogravimetric analyzer (TGA) and differential thermal gravimetry (DTG) analysis of exemplary compositions.
Figure 4B:
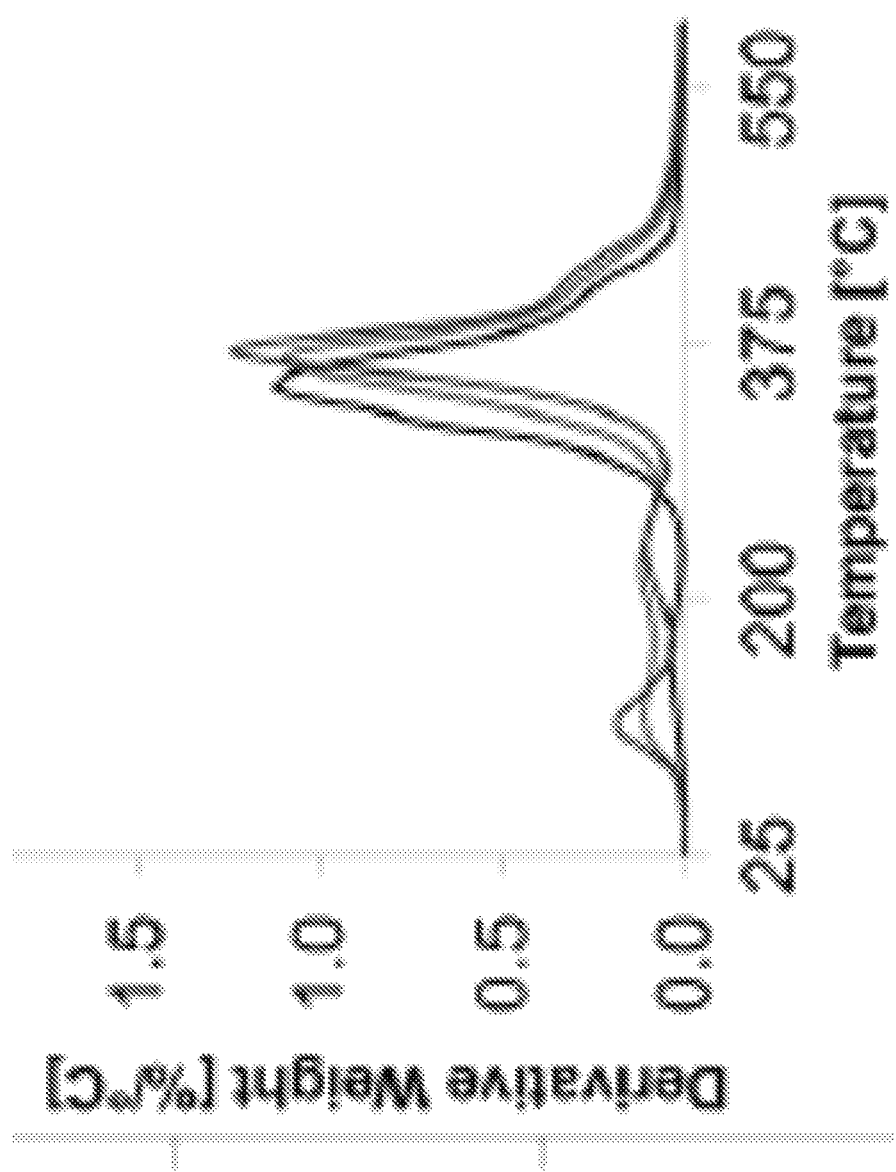

FIG. 4A shows representative Thermogravimetric Analysis (TGA) for the samples, with the corresponding Differential Thermal Gravimetry (DTG) curves in FIG. 4B. These tests were run under nitrogen to prevent weight loss due to oxidation, and thus purely capture the thermal decomposition of the bonds within the epoxy samples. The main decomposition temperatures ($T_d$) were found via the tallest peaks in the DTG curves, and were 349.10±3.77° C., 363.91±1.72° C., and 369.09±2.26° C., for the neat, 10 wt % Cinn, and 10 wt % Di-Cinn samples, respectively. The addition of the mechanophore did shift the main decomposition temperature higher than the neat by approximately 15 to 20° C., for the Cinn and Di-Cinn mechanophores, respectively.

However, there is a notable weight loss in the mechanophore containing composites of approximately 20% from 90 to 310° C., followed by the main degradation. From the DTG curves, it also appears that there are two small peaks before the main $T_d$ at 120 and 236° C. The $T_d$ values of the pure cinnamamide and di-cinnamamide (prior to embedding) were found to be 249.15±1.24° C. and 251.68±7.45° C., respectively, and occurred in one sharp decomposition step, with little to no weight loss before 200° C. This degradation of the mechanophores themselves help to explain the second slight decomposition step near 236° C. in the composites, thus the first small decomposition step near 120° C. is likely due to the breaking of the bonds between the mechanophore units and the epoxy matrix. This step is more pronounced in the Di-Cinn sample, and is likely due to the lessened conjugation of the dimer with the matrix initially, due to di-substitution of the dimers, rather than the full substitution seen with the cinnamamide-resin reaction.

Figure 5A:
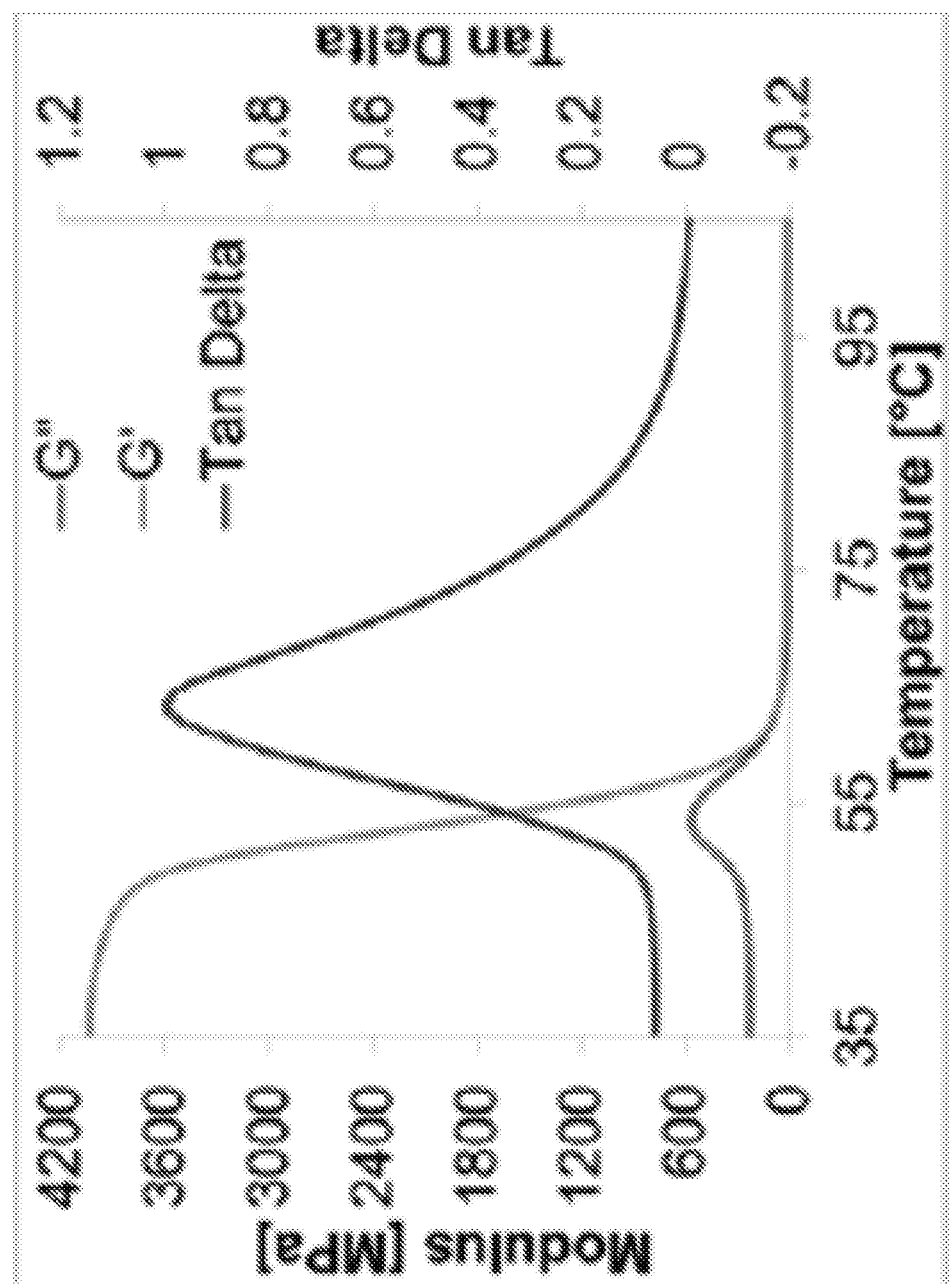
FIGS. 5A-C are dynamic mechanical analyzer (DMA) analysis of exemplary compositions. DMA curves showing the storage modulus (G', green), loss modulus (G", red), and tan delta (blue) of the FIG. 5A: neat epoxy.
Figure 5B:
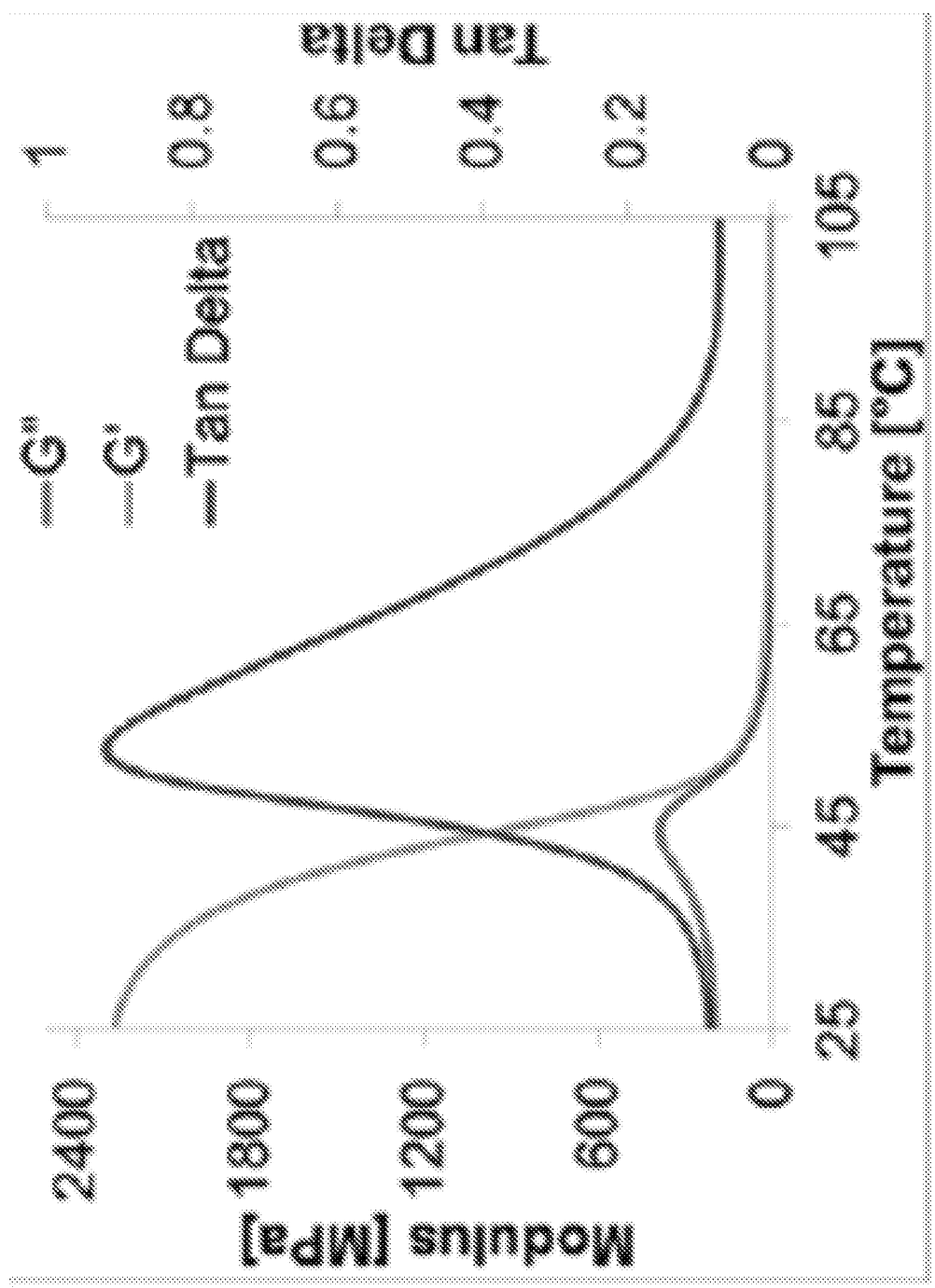
Figure 5C:
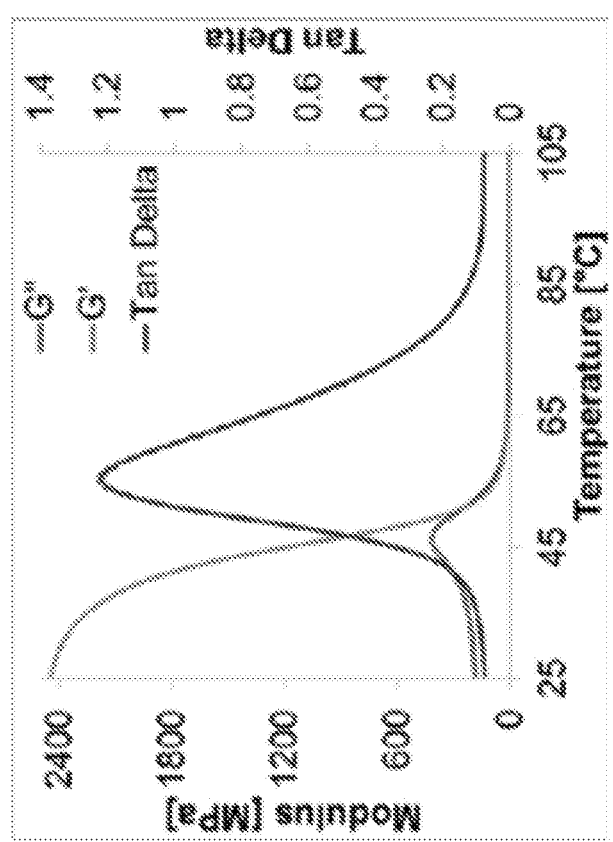

In addition to utilizing DSC to determine $T_g$ values, Dynamic Mechanical Analysis (DMA) can be used, with representative curves seen in FIG. 5A-C. The peak of the tan delta (tan δ) curve in DMA is used to determine the $T_g$ value for the sample, with tan δ being defined as the ratio between the loss and storage moduli. From DMA, the $T_g$ values over 4 runs of each sample were 60.83±1.50° C., 52.66±2.80° C., and 52.23±2.05° C., for the neat epoxy, and the 10 wt % cinnamamide di-cinnamamide composites, respectively. This makes for a lowering of the $T_g$ from the neat by about 9° C. for the mechanophore grafted samples, with the mechanophore grafted samples having statistically similar $T_g$ values. It should be noted that this depression is slightly more than what was seen with the DSC, and overall, all of the $T_g$ values are greater with the DMA compared to the DSC. These results can be hypothesized to be from the mechanical determination of the $T_g$ in DMA, rather than the thermal determination in DSC.

DMA can also be used to calculate crosslink density for a given sample, according to the theory of rubber elasticity, $$\rho_{xl} = \frac{G'}{3RT},$$

where $\rho_{xl}$ is the crosslink density expressed in moles of elastically effective network chains per cm$^3$ of sample, G' is the rubbery plateau modulus, R is the Gas Constant, and T is the absolute temperature at which the rubbery plateau storage modulus is determined. The crosslink densities were thus calculated to be 0.73±0.01×10$^3$ mol/cm$^3$, 0.55±0.02×10$^3$ mol/cm$^3$, and 0.63±0.09×10$^3$ mol/cm$^3$ for the neat epoxy, and the 10 wt % cinnamamide and di-cinnamamide composites, respectively. Similar to the other thermomechanical property comparisons, the neat epoxy was expected to be more highly crosslinked than either mechanophore containing composite.

Figure 6:
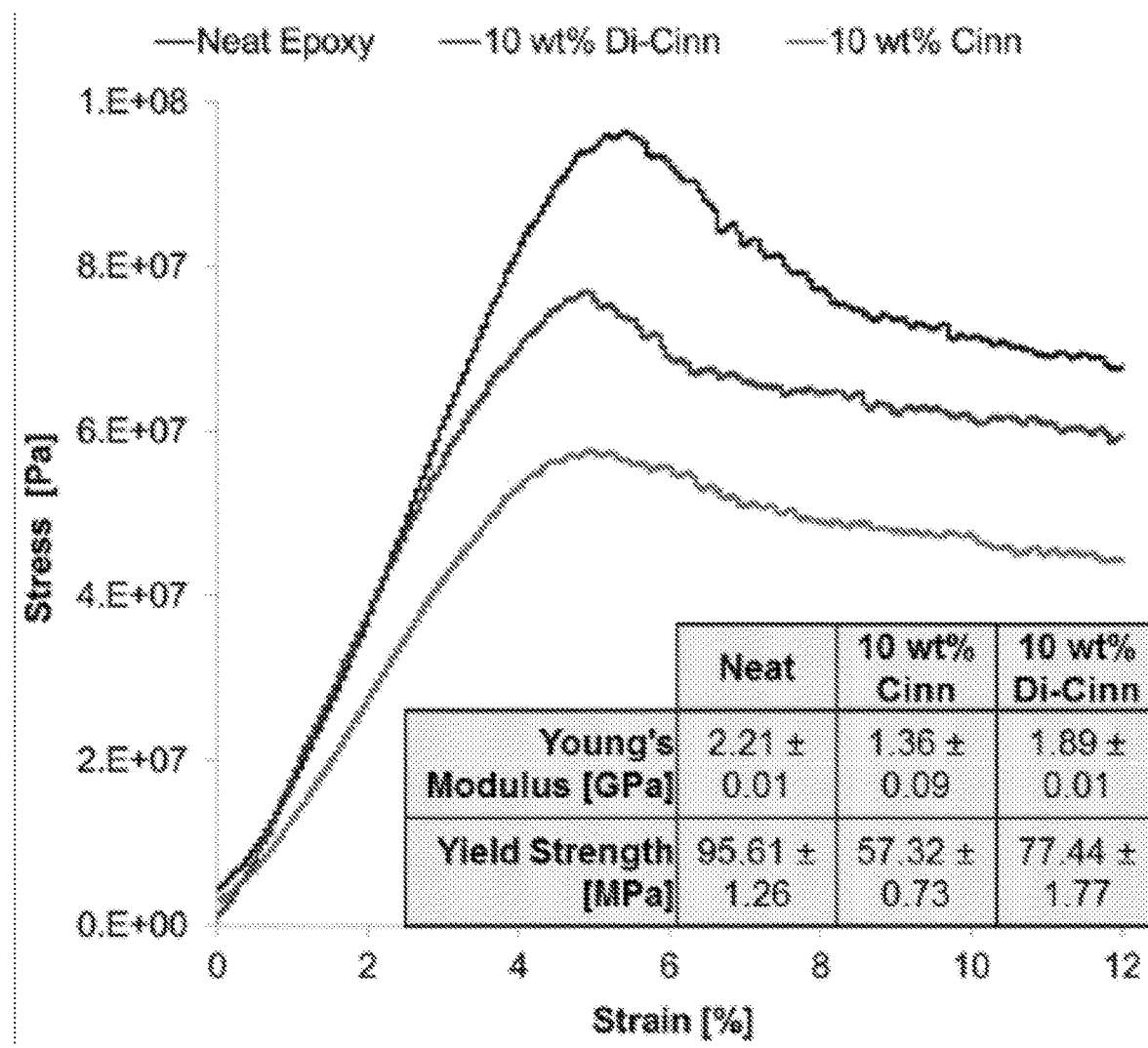
FIG. 6 is a plot of stress-strain curves for the neat epoxy (black), and the 10 wt % Cinn (red) and 10 wt % Di-Cinn (blue) epoxy composites, with the lower right inset showing the resulting Young's Modulus and Yield strength values.

Compressive Mechanochemical Activation and Observed Fluorescent Response:

To evaluate the mechanochemical response of the mechanophore-grafted nanocomposites, compression tests were used to apply repeatable and quantifiable damage to the thermoset samples. From these compression tests, stress-strain curves were obtained for each of the different sample types, as seen in FIG. 6. The Young's modulus values were calculated from the slope in the linear elastic region of the curves, and were found to be 2.21±0.01 GPa, 1.36±0.09 GPa, and 1.89±0.09 GPa for the neat epoxy, 10 wt % Cinn and 10 wt % Di-Cinn epoxy composites, respectively. Thus, there was a notable decrease in the Young's modulus upon 10 wt % cinnamamide mechanophore incorporation, but the use of 10 wt % di-cinnamamide notably increases the Young's modulus value. Similarly, the yield strength values were 95.61±1.26 MPa, 57.32±0.73 MPa, and 77.44±1.77 MPa for the neat, 10 wt % Cinn, and 10 wt % Di-Cinn epoxy samples, respectively. This increase in the mechanical properties when Di-Cinn is used as opposed to Cinn is, again, likely due to the higher crosslink density in the Di-Cinn composites from the mechanophore cyclobutane dimers being formed prior to incorporating in to the epoxy mixture.

Fluorescence microscopy was then used in tandem with the compression tests to evaluate the fluorescent response of the self-sensing thermoset network composites, with fluorescence images taken at the strain values of 0, 2, 4, 6, 10, and 15%. From the compression test curves, 0% strain is the baseline value prior to compression, while 2% and 4% strain are in elastic region, with 4% immediately before the yield point. 6% strain is immediately after the yield point, and 10 and 15% strain are well into the plastic region.

Figure 7A:
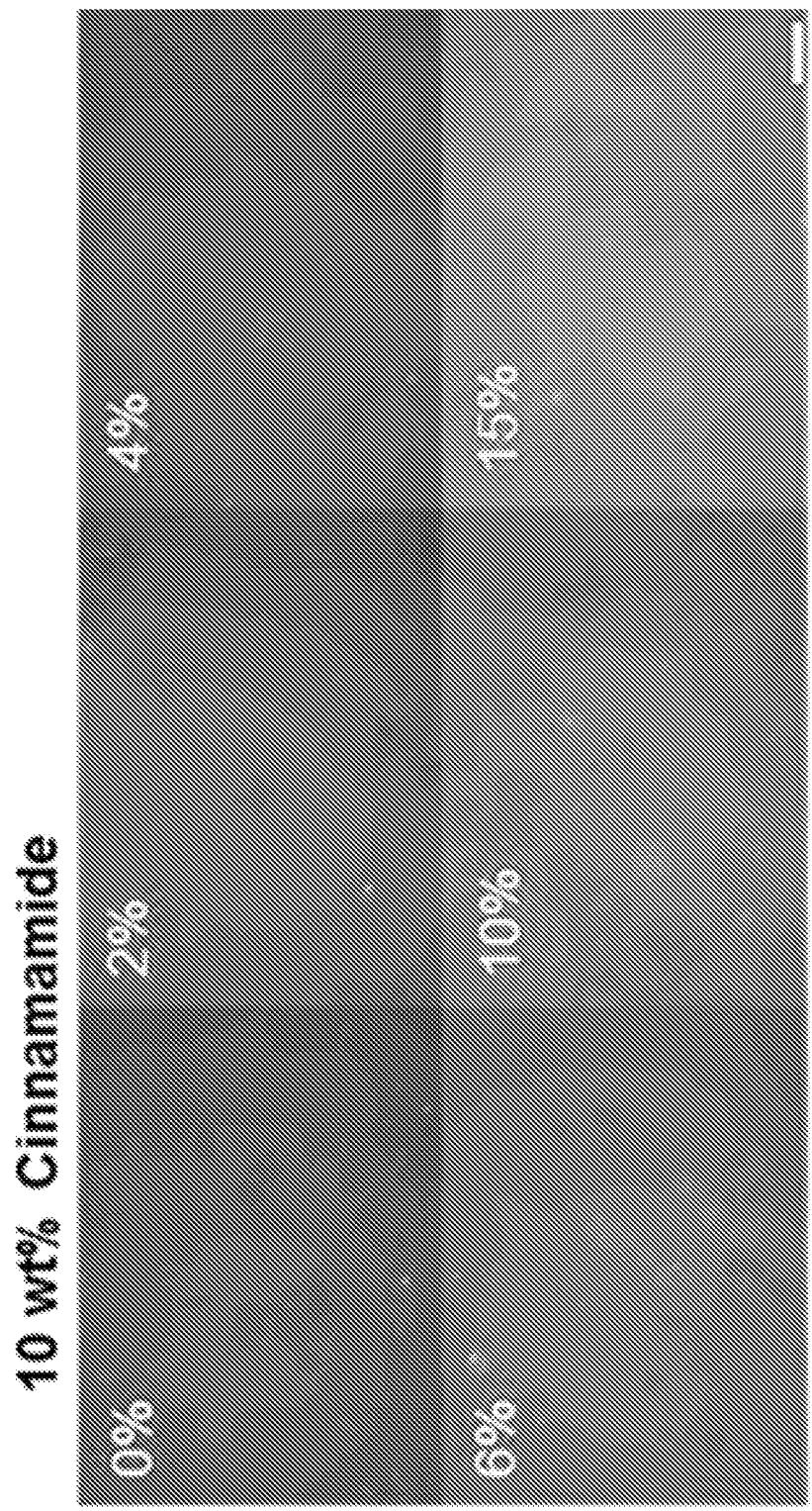
FIGS. 7A-B are the fluorescence response to self-sensing of exemplary compositions. Fluorescence images for the mechanophore-embedded epoxy composites identifying the strain values for which the images were taken, for FIG. 7A: 10 wt % Cinnamamide
Figure 7B:
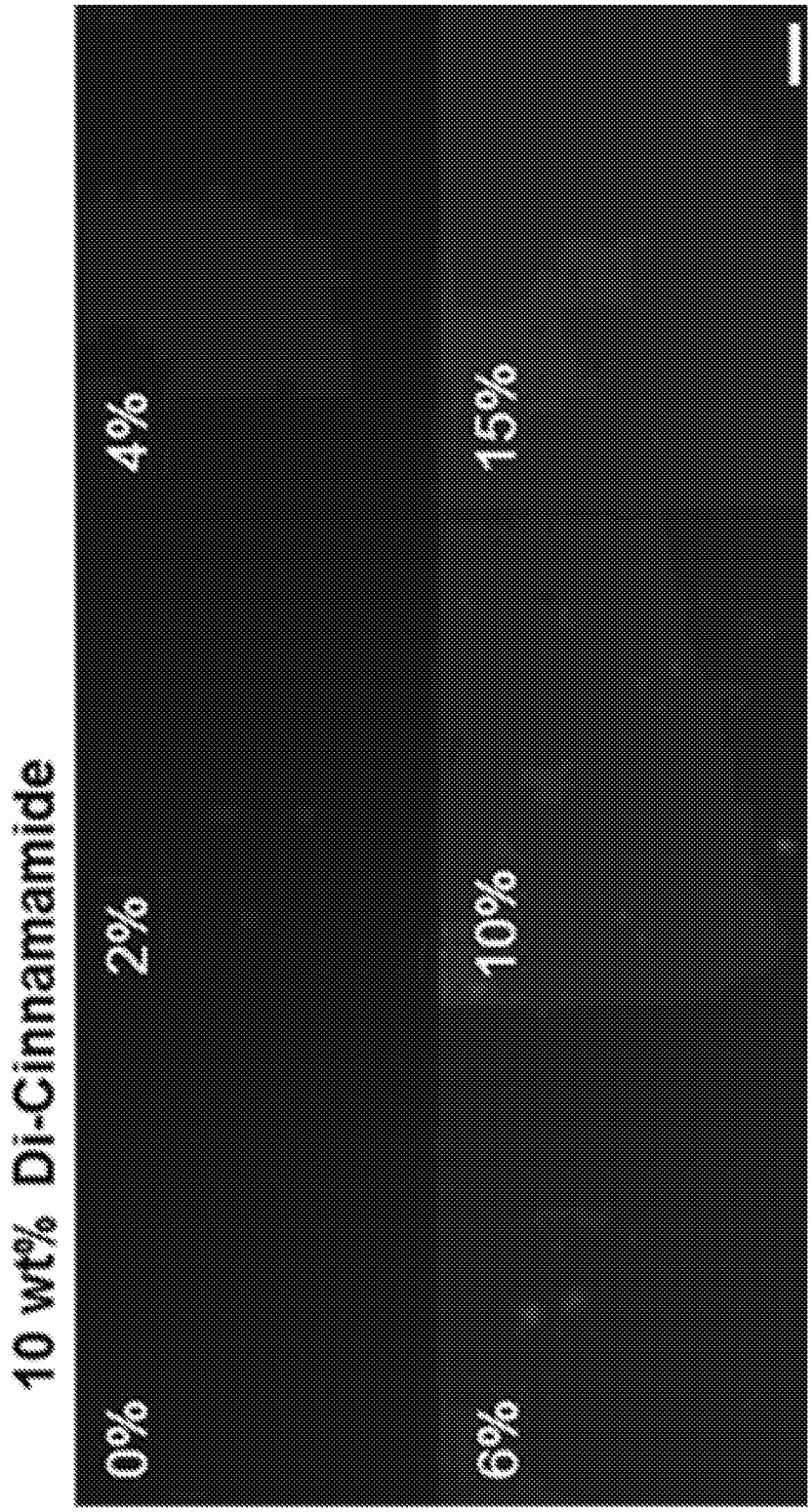

Representative images for the selected strain values for the 10 wt % Cinn and Di-Cinn epoxy nanocomposites can be seen in FIGS. 7A and B, respectively. These images were taken under excitation of 340-380 nm UV light, capturing the fluorescent emission between 500-550 nm. The raw 8-bit gray scale fluorescence images were pseudocolored green and the brightness and contrast were increased by 40% for better visualization. It can be clearly seen that the 10 wt % Cinn composite has a much higher fluorescent emission overall compared to the 10 wt % Di-Cinn composite, which was further confirmed by the macroscale visualization of the samples and the fluorometer data. This reinforces the hypothesis that the cinnamamide groups in this composite are much less crosslinked, and less mechanically sensitive cyclobutane units are formed, than when the di-cinnamamide is incorporated into the epoxy. For both of the composites studied, there is an overall increase in the fluorescence with an increase of the strain applied. There seems to be a noticeable difference between the 4 and 6% strain values, thus quantification of the fluorescence via ImageJ was performed to analyze the phenomenon further.

Figure 8A:
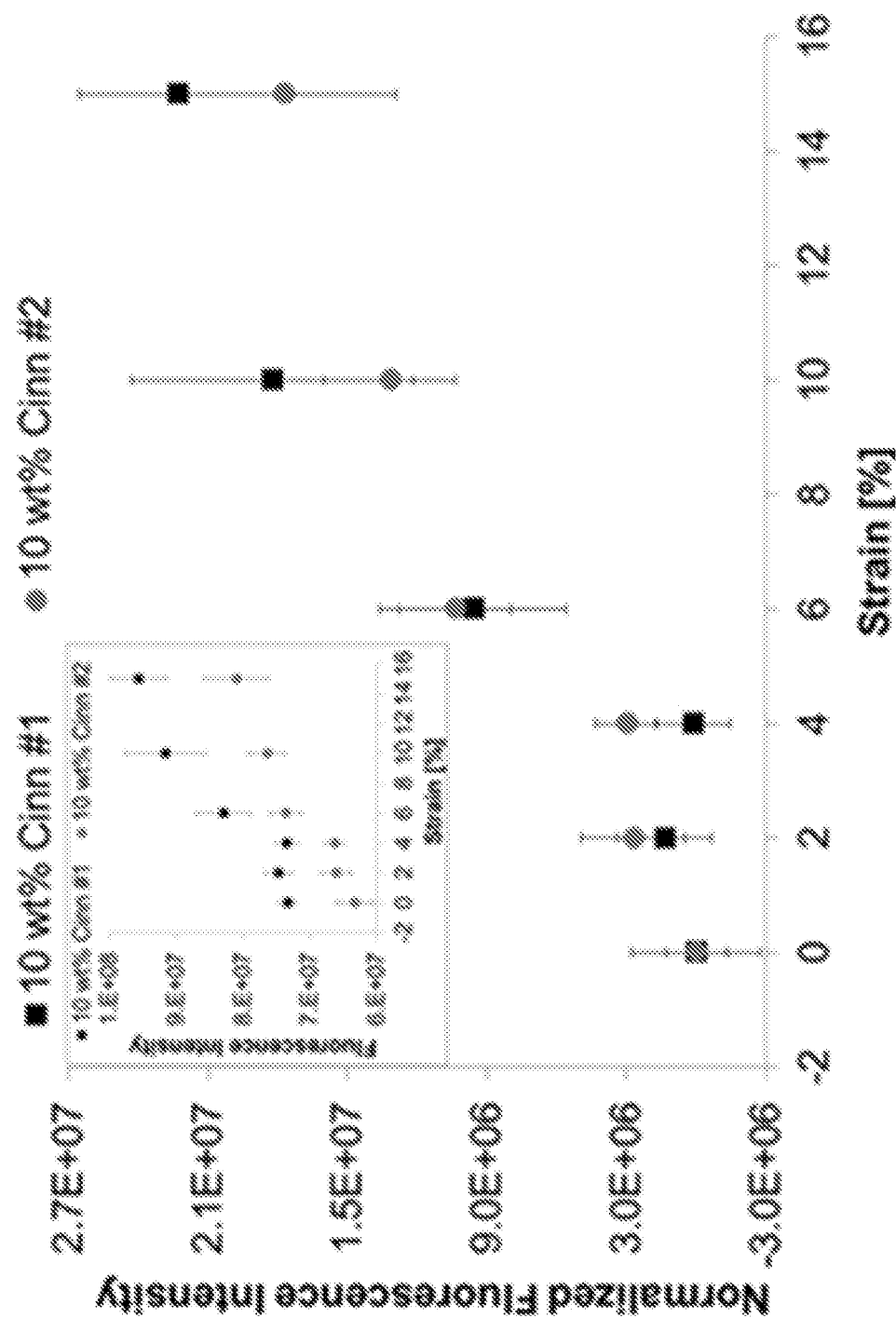
FIGS. 8A-B show the relationship between fluorescence and strain % of exemplary compositions.
Figure 8B:
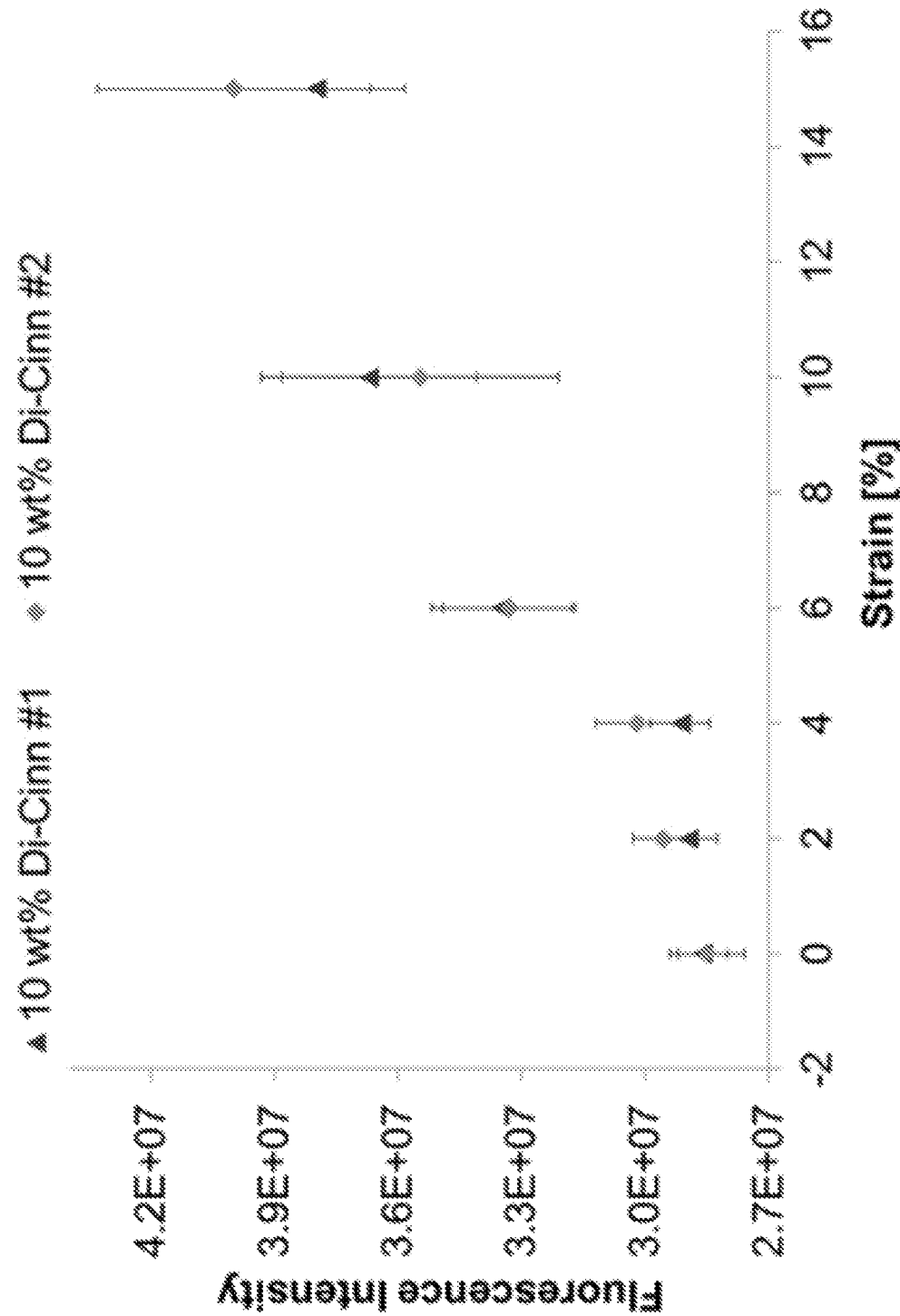

For each sample analyzed, the ten fluorescence images were taken representative of the sample face and the ImageJ software calculated average fluorescence intensity values for each image. For each composite batch made, two samples for each strain percentage would be analyzed, thus each point shown in FIG. 8A-B is an average of 20 images. The upper left inset of FIG. 8A shows the raw fluorescence intensity data for 2 batches of the 10 wt % Cinn epoxy composite, which were found to have slightly different fluorescence intensity values initially, likely due to the variation in the UV curing of the epoxy samples, which could be attributed to the light penetration depth, among other factors. However, when the curves are overlaid by normalizing the intensities to the 0% strain value, there is good agreement in the shape of the curve and the strains at which damage can be detected, as seen in the main image of FIG. 8A. There is no significant difference in the fluorescent intensity values between the 0, 2, and 4% strains, but there is a marked increase in the fluorescence intensity at the 6% strain mark, which is immediately after the yield point, and can serve as early damage detection. The 10 and 15% strain values show a further increase in the intensity with the applied strain, as expected.

Similarly, FIG. 8B shows the raw fluorescence intensity data for two batches of the 10 wt % Di-Cinn epoxy composite, with no normalization, showing good agreement between the batches. Both batches have nearly identical starting fluorescences, and there is not a significant increase in the intensity for the batches of 2 or 4% strain. However, akin to the 10% Cinn composite batches, there is a marked statistical increase in the fluorescence at the 6% strain, with the intensity increasing with the application of 10 or 15% strain. Thus, despite covalent incorporation into the epoxy network, there does not appear to be an improvement in the occurrence of the fluorescent response, likely due to the limitation of the cinnamoyl chemistry in terms of its fluorescence quantum yield. This shows that Cinn or Di-Cinn can be covalently grafted into a thermoset epoxy network and can additionally be used as a stress-responsive mechanophore via fluorescent signal generation, and that applying increasing strain increases the fluorescence emission, due to the breaking of the formed cyclobutane dimers, causing reversion to the fluorescent monomeric form.

In summary, described herein are novel, grafted, covalently-bonded, self-sensing mechanophore-embedded thermoset network nanocomposites. The mechanophore studied was cinnamamide, as its amine group can covalently bond to the epoxy resin chosen, in a similar matter to the crosslinking of the resin with the chosen hardener in the neat epoxy system. Cinnamamide was able to form a cyclobutane type dimer (di-cinnamamide) under UV photoirradiation via [2+2] cycloaddition. Thus two routes were studied for the mechanophore covalent incorporation into an epoxy matrix, the first being the reaction of the cinnamamide mechanophore precursor with the epoxy resin to ensure covalent bond formation, with subsequent hardener addition. The epoxy mixture was then UV cured so that the cyclobutane mechanophore units could be formed via photodimerization, while the conventional resin-hardener curing took place. The second route was first form di-cinnamamide in solution under UV light, then to react it with the epoxy resin, with subsequent hardener addition and conventional epoxy bond formation. In this second method, there were more cyclobutane rings present in the final nanocomposite, as di-cinnamamide was theoretically 100% dimerized prior to addition, thereby affecting the resulting material properties of the composites. The chemistry of the covalent bonding between the mechanophore units and the epoxy constituents was confirmed via extensive FTIR study, and effect on the composite material properties including the $T_g$, decomposition temperature, crosslink density, Young's modulus, and yield strength was studied. By these methods, it was determined that the amount of cyclobutane bond generation and the mechanophore-resin substitution amount affected the resulting material and sensing properties. Compression tests were used to apply damage to the mechanophore-embedded networks, and fluorescent early damage detection occurred immediately after the yield point for both the cinnamamide and di-cinnamamide systems. Overall, both the routes of mechanophore incorporation were successful in creating grafted, self-sensing thermoset network composites, which were capable of early damage detection via fluorescent emission.

Various features and advantages of the invention are set forth in the following claims.

What is claimed is:

1. A composition comprising:
   a thermosetting polymer network, and
   a mechanophore covalently bonded to the thermosetting polymer network, wherein the mechanophore is derived from cinnamamide.

2. The composition of claim 1, wherein the mechanophore comprises

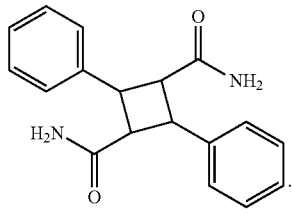 [SMILES: NC(=O)C1C(c2ccccc2)C(C(N)=O)C1c1ccccc1]

3. The composition of claim 1, wherein the mechanophore is covalently bonded to the thermosetting polymer network through an amine of the mechanophore and an epoxide of the thermosetting polymer network.

4. The composition of claim 1, wherein the thermosetting polymer network is derived from a polyurethane, an epoxy resin, a polyester resin, or a combination thereof.

5. The composition of claim 1, wherein the mechanophore optically changes upon application of a mechanical load to the composition in excess of a predetermined level.

6. The composition of claim 5, wherein the optical change is measured by fluorescence.

7. The composition of claim 5, wherein the predetermined level corresponds to a strain value of at least 6% being applied to the composition.

8. The composition of claim 1, wherein the mechanophore is present at about 1 wt % to about 30 wt % of the composition.

9. The composition of claim 1, wherein the composition has a glass transition temperature ($T_g$) of about 1° C. to about 10° C. lower than the $T_g$ of the thermosetting polymer network without the mechanophore.

10. A substrate comprising the composition of claim 1, wherein the composition optically changes upon application of a mechanical load to the substrate in excess of a predetermined level.

11. The substrate of claim 10, wherein the predetermined level is the yield point of the composition.

* * * * *